US012354819B2

(12) United States Patent
Zhong et al.

(10) Patent No.: US 12,354,819 B2
(45) Date of Patent: Jul. 8, 2025

(54) HIGH-VOLTAGE DC RELAY

(71) Applicant: Xiamen Hongfa Electric Power Controls Co., Ltd., Xiamen (CN)

(72) Inventors: Shuming Zhong, Xiamen (CN); Jinpin Chen, Xiamen (CN); Wenguang Dai, Xiamen (CN); Songsheng Chen, Xiamen (CN)

(73) Assignee: Xiamen Hongfa Electric Power Controls Co., Ltd., Xiamen (CN)

( * ) Notice: Subject to any disclaimer, the term of this patent is extended or adjusted under 35 U.S.C. 154(b) by 143 days.

(21) Appl. No.: 17/921,463

(22) PCT Filed: Apr. 29, 2021

(86) PCT No.: PCT/IB2021/053568
§ 371 (c)(1),
(2) Date: Oct. 26, 2022

(87) PCT Pub. No.: WO2021/220212
PCT Pub. Date: Nov. 4, 2021

(65) Prior Publication Data

US 2023/0178318 A1 Jun. 8, 2023

(30) Foreign Application Priority Data

Apr. 30, 2020 (CN) ......................... 202010366809.1
Apr. 30, 2020 (CN) ......................... 202020715184.0
May 19, 2020 (CN) ......................... 202010426551.X

(51) Int. Cl.
*H01H 50/14* (2006.01)
*H01H 50/02* (2006.01)
*H01H 50/44* (2006.01)

(52) U.S. Cl.
CPC ............ *H01H 50/14* (2013.01); *H01H 50/02* (2013.01); *H01H 50/44* (2013.01)

(58) Field of Classification Search
CPC ........ H01H 50/14; H01H 50/02; H01H 50/44; H01H 9/0066; H01H 50/541; H01H 2011/0087
(Continued)

(56) References Cited

U.S. PATENT DOCUMENTS 8,138,863 B2 * 3/2012 Tanaka .................. H01H 50/38 335/131
8,138,872 B2 * 3/2012 Yoshihara ............. H01H 50/36 335/185

(Continued)

FOREIGN PATENT DOCUMENTS

CN 105551896 A 5/2016
CN 105895452 A 8/2016

(Continued)

OTHER PUBLICATIONS

International Search Report and Written Opinion mailed Aug. 9, 2021, in connection with International Application No. PCT/IB2021/053568.

(Continued)

*Primary Examiner* — Shawki S Ismail
*Assistant Examiner* — Lisa N Homza
(74) *Attorney, Agent, or Firm* — Wolf, Greenfield & Sacks, P.C.

(57) ABSTRACT

A high-voltage DC relay convenient for quick assembly includes a housing, and load leading-out terminals, coil leading-out terminals and auxiliary leading-out terminals being provided with a connecting part for electrical connection with an external component. The connecting parts are respectively exposed to the housing; the connecting part of the load leading-out terminal is arranged at a top end of the housing; and the connecting parts of the coil leading-out terminal and the auxiliary leading-out terminal is arranged at
(Continued)

a bottom end of the housing. Each connecting part has a welding plane for electrical connection with a corresponding one of the external components through quick welding. The present disclosure can realize the rapid welding assembly of products, maximize production efficiency of assembly and welding, and has characteristics of simple structure, low manufacturing cost and reliable electrical connection.

12 Claims, 24 Drawing Sheets

(58) Field of Classification Search
USPC .......................................................... 335/185
See application file for complete search history.

(56) References Cited

U.S. PATENT DOCUMENTS

| | | | | |
|---|---|---|---|---|
| 8,179,217 | B2 * | 5/2012 | Kawaguchi ........ | H01H 51/2209<br>335/85 |
| 8,653,915 | B2 * | 2/2014 | Schmidt ................. | H01H 51/06<br>335/185 |
| 2009/0322453 | A1 * | 12/2009 | Kawaguchi ........... | H01F 7/1615<br>335/81 |
| 2009/0322454 | A1 * | 12/2009 | Tanaka ................... | H01H 50/38<br>335/189 |
| 2009/0322455 | A1 * | 12/2009 | Yoshihara .......... | H01H 51/2209<br>335/189 |
| 2011/0221548 | A1 * | 9/2011 | Yoshihara .............. | H01H 51/29<br>335/185 |
| 2013/0106542 | A1 * | 5/2013 | Yano ...................... | H01H 50/00<br>335/185 |
| 2013/0106544 | A1 * | 5/2013 | Schmidt ................. | H01H 51/06<br>335/202 |
| 2014/0062626 | A1 * | 3/2014 | Saito ...................... | H01H 51/04<br>335/185 |
| 2016/0133404 | A1 * | 5/2016 | Zhong .................. | H01H 50/546<br>335/201 |
| 2019/0006140 | A1 * | 1/2019 | Shi ....................... | H01H 50/546 |
| 2019/0148095 | A1 * | 5/2019 | Minowa ................. | H01H 50/14<br>335/185 |
| 2020/0035432 | A1 * | 1/2020 | Chen .................... | H01H 50/545 |
| 2020/0373111 | A1 * | 11/2020 | Zhong .................... | H01H 50/02 |
| 2022/0013316 | A1 * | 1/2022 | Zhong .................. | H01H 50/546 |
| 2023/0090245 | A1 * | 3/2023 | Zhong .................. | H01H 50/541<br>335/185 |
| 2023/0101203 | A1 * | 3/2023 | Minowa ................. | H01H 50/02<br>335/185 |
| 2023/0178319 | A1 * | 6/2023 | Zhong .................... | H01H 50/14<br>335/196 |
| 2023/0197388 | A1 * | 6/2023 | Hoffmann ............ | H01H 50/546<br>335/151 |
| 2023/0395347 | A1 * | 12/2023 | Zhong .................... | H01H 50/20 |
| 2024/0006139 | A1 * | 1/2024 | Zhong .................. | H01H 50/163 |
| 2024/0177956 | A1 * | 5/2024 | Zhong .................... | H01H 50/28 |

FOREIGN PATENT DOCUMENTS

| | | | |
|---|---|---|---|
| CN | 106992098 | A | 7/2017 |
| CN | 107026056 | A | 8/2017 |
| CN | 212032952 | U | 11/2020 |
| CN | 212032963 | U | 11/2020 |
| DE | 42 43 852 | C1 | 3/1994 |
| EP | 3 432 336 | A1 | 1/2019 |
| WO | WO 2013/097698 | A1 | 7/2013 |

OTHER PUBLICATIONS

Oikawa et al. Development of Laser Welding Technology for Mass Production of Signal Relays. NEC Research & Development. Apr. 2000;41(2):193-197.
Chinese Office Action dated Jul. 5, 2024, in connection with Chinese Application No. 202010366809.1, and English translation thereof.
Chinese Notice of Allowance dated Sep. 27, 2024, in connection with Chinese Application No. 202010426551.X.
CN 202010426551.X, Sep. 27, 2024, Chinese Notice of Allowance.

* cited by examiner

HIGH-VOLTAGE DC RELAY

CROSS-REFERENCE

The present invention is a national stage filing under 35 U.S.C. § 371 of international PCT application PCT/IB2021/053568, filed Apr. 29, 2021 which claims the benefit of Chinese application No. 202020715184.0, filed on Apr. 30, 2020, Chinese Application No. 202010366809.1 filed on Apr. 30, 2020, and Chinese Application No. 202010426551.X filed on May 19, 2020, each of which are hereby incorporated by reference in their entirety.

TECHNICAL FIELD

The present disclosure relates to the technical field of a relay, in particular to a high-voltage direct circuit (DC) relay convenient for quick assembly.

BACKGROUND

Most of the existing DC relays adopt a movable spring direct-acting type (also called a solenoid direct-acting type) structure. The contacting part of this type of DC relay includes two main static contacts (i.e., the load leading-out terminal) and one moving assembly. The moving assembly includes a movable spring part and a push rod assembly. The movable spring part is composed of a movable spring and main movable contacts at both ends of the movable spring, and the movable spring is a direct-acting type. When the main movable contacts at both ends of the movable spring are in contact with the two main static contacts respectively, current flows in from one of the main static contacts, and flows out from the other of the main static contacts after passing through the movable spring. In order to realize functions such as monitoring, the DC relay in the prior art is also equipped with auxiliary contacts. The auxiliary lead-out terminals of a kind of DC relay in the prior art are provided on the ceramic cover. It is required that load leading-out terminal, auxiliary leading-out terminal and coil leading-out terminal are electrically connected with external components when this kind of DC relay is installed. The conventional electrical connection mainly involves threaded connection, connector connection, signal line connection, coil QC (quick-connection) leading-out terminal connection, PCB lead connection and so on. However, these electrical connections are not suitable for assembly line production; at the same time, these electrical connections have other drawbacks, for example, the auxiliary leading-out terminal and the coil leading-out terminal adopt a leading-out pin structure of the conventional pin-type. However, such leading-out pin structure of the conventional pin-type has requirement for a length of the leading-out pin, takes-up-space, is easy to break when being shaken, and the soldering is prone to false soldering, and thereby affecting the reliability of the electrical connection between the relay and the external components.

SUMMARY

According to one aspect of the present disclosure, a high-voltage DC relay convenient for quick assembly comprises a housing, load leading-out terminals, coil leading-out terminals, and auxiliary leading-out terminals. Each of the load leading-out terminals, the coil leading-out terminals and the auxiliary leading-out terminals being provided with a connecting part for electrical connection with an external component. Wherein the connecting parts of the load leading-out terminals, the coil leading-out terminals, and the auxiliary leading-out terminals are respectively exposed to the housing. The connecting parts of the load leading-out terminals are arranged at a top end of the housing; and the connecting parts of the coil leading-out terminals and the auxiliary leading-out terminals are arranged at a bottom end of the housing. Each of the connecting parts of the load leading-out terminals, the coil leading-out terminals and the auxiliary leading-out terminals has a welding plane for electrical connection with a corresponding one of the external components through quick welding, and the welding planes of the connecting parts of the load leading-out terminals, the coil leading-out terminals and the auxiliary leading-out terminals are parallel mutually.

According to one embodiment of the present disclosure, the high-voltage DC relay further comprises a ceramic cover and a coil bobbin; the ceramic cover and the coil bobbin are respectively accommodated in the housing and arranged up and down; the load leading-out terminals arranged at a top of the ceramic cover; the coil leading-out terminals are arranged at a bottom of the coil bobbin; heads of the auxiliary leading-out terminals are arranged at the top of the ceramic cover, tails of the auxiliary leading-out terminals extended to the bottom end of the housing by bypassing lateral sides of the ceramic cover and the coil bobbin; and the connecting parts of the auxiliary leading-out terminals are at the tails of the auxiliary leading-out terminals.

According to one embodiment of the present disclosure, each of the auxiliary leading-out terminals comprises an auxiliary static contact and a first connecting sheet; the auxiliary static contact is fixed at the top of the ceramic cover; one end of the first connecting sheet is connected with the auxiliary static contact at a top end of the ceramic cover, and a middle section of the first connecting sheet is bent so that the other end of the first connecting sheet serves as the tail of the auxiliary leading-out terminals and thereby is at the bottom end of the housing, so as to form the connecting part.

According to one embodiment of the present disclosure, the connecting part of the auxiliary leading-out terminals are bent to be U-shaped.

According to one embodiment of the present disclosure, the high-voltage DC relay further comprises a first injection piece in which a part of the first connecting sheet above the top end of the ceramic cover is covered, and a second injection piece in which a part of the first connecting sheet outside the lateral sides of the ceramic cover and the coil bobbin is covered.

According to one embodiment of the present disclosure, the second injection piece also covers top ends of two side walls of the connecting part in the U-shaped of the auxiliary leading-out terminals.

According to one embodiment of the present disclosure, a part of the first connecting sheet that is exposed outside the first injection piece and the second injection piece and is between the first injection piece and the second injection piece is a connecting section, and the connecting section is bent to be arc-shaped.

According to one embodiment of the present disclosure, the coil leading-out terminal comprises a winding post and a second connecting sheet, and the winding post is integrally connected to one end of the second connecting sheet, and the other end of the second connecting sheet constitutes a connecting part of the coil leading-out terminal; the coil bobbin covers a part of the second connecting sheet.

According to one embodiment of the present disclosure, the connecting part of the coil leading-out terminals are bent to be U-shaped.

According to one embodiment of the present disclosure, a protrusion extends and is provided at the top of one of the two side walls of the connecting part in the U shape of the coil leading-out terminal, and the coil bobbin covers a tail end of the protrusion.

According to one embodiment of the present disclosure, the housing comprises an outer casing and a bottom plate; a receding notch and a receding through hole are defined in the bottom plate, the receding notch is located at an exposed position corresponding to the connecting part of the coil leading-out terminal, and the receding through hole is located at an exposed position corresponding to the connecting part of the auxiliary leading-out terminal.

According to one embodiment of the present disclosure, on a bottom surface of the bottom plate, receding slots are further provided on a periphery of the receding through hole and a periphery of the receding notch.

The present disclosure will be further described in detail below with reference to the drawings and embodiments; however, the high-voltage DC relay convenient for quick assembly of the present disclosure is not limited to the embodiments.

BRIEF DESCRIPTION OF THE DRAWINGS

The above and other features and advantages of the present disclosure will become more apparent by describing in detail exemplary embodiments thereof with reference to the accompanying drawings.

DETAILED DESCRIPTION

Figure 1:
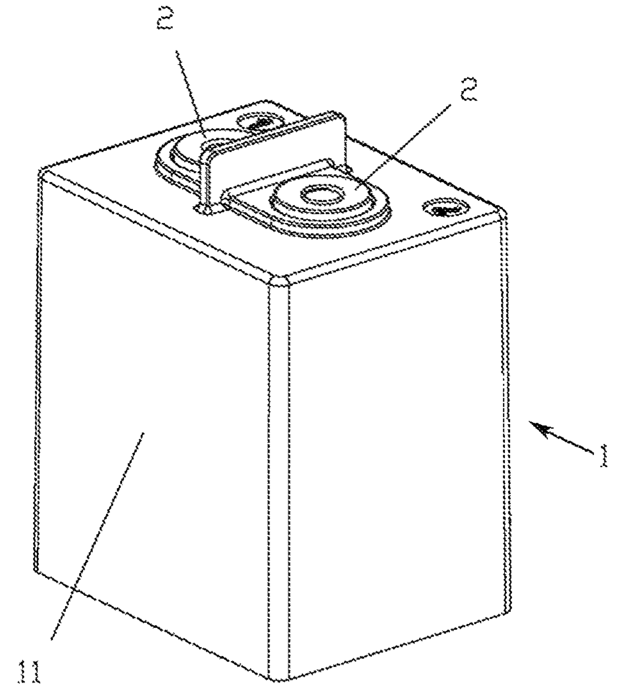
FIG. 1 is a perspective schematic view of a high-voltage DC relay according to an embodiment of the present disclosure.

Now, the exemplary implementations will be described more completely with reference to the accompanying drawings. However, the exemplary implementations can be done in various forms and should not be construed as limiting the implementations as set forth herein. Although relative terms such as "above" and "under" are used herein to describe the relationship of one component relative to another component, such terms are used herein only for the sake of convenience, for example, in the direction shown in the figure, it should be understood that if the referenced device is inversed upside down, a component described as "above" will become a component described as "under". When a structure is described as "above" another structure, it probably means that the structure is integrally formed on another structure, or, the structure is "directly" disposed on another structure, or, the structure is "indirectly" disposed on another structure through an additional structure.

Exemplary embodiments will now be described more fully by reference to the accompanying drawings. However, the exemplary embodiments can be implemented in various forms and should not be understood as being limited to the examples set forth herein; rather, the embodiments are provided so that this disclosure will be thorough and complete, and the conception of exemplary embodiments will be fully conveyed to those skilled in the art. The same reference signs in the drawings denote the same or similar structures and detailed description thereof will be omitted.

Referring to FIGS. 1-13, a high-voltage DC relay convenient for quick assembly of the present disclosure includes a housing 1, load leading-out terminals 2, coil leading-out terminals 3, and auxiliary leading-out terminals 4. The number of each of the load leading-out terminals 2, the coil leading-out terminals 3 and the auxiliary leading-out terminals 4 is two. Each of the load leading-out terminals 2, the coil leading-out terminals 3 and the auxiliary leading-out terminals 4 is provided with a connecting part 21, 31, 41 for electrical connection with an external component, for example a copper bar. The connecting parts 21, 31, 41 of the load leading-out terminals 2, the coil leading-out terminals 3, and the auxiliary leading-out terminals 4 are respectively exposed to the housing 1. The connecting parts 21 of the load leading-out terminals 2 are arranged at a top end of the housing 1; and the connecting parts 31, 41 of the coil leading-out terminals 3 and the auxiliary leading-out terminals 4 are arranged at a bottom end of the housing 1. The top and bottom ends defined in the present disclosure refer to two positions opposite to each other, generally refer to the top and bottom ends when the product is installed, and the product itself can be in up and down directions, in front and rear directions, or in left and right directions. The front and rear directions or the left and right directions are usually turned into the up and down directions during installation. Of course, such circumstance of the product with the top end facing forward and the bottom end facing back during installation cannot be excluded. The connecting parts 21, 31, 41 of the load leading-out terminals 2, the coil leading-out terminals 3 and the auxiliary leading-out terminals 4 respectively have welding plane 211, 311, 411 for electrical connection with a corresponding one of the external components, for example the copper bar through quick welding, and the welding planes 211, 311, 411 of the connecting parts 21, 31, 41 of the load leading-out terminals 2, the coil leading-out terminals 3 and the auxiliary leading-out terminals 4 are parallel mutually. Further, the welding planes 211, 311, 411 may be parallel to a horizontal plane. The quick welding according to the present disclosure may be laser welding, electron beam welding, resistance welding, etc.

In one embodiment, the high-voltage DC relay further comprises a ceramic cover 5 and a coil bobbin 6; the ceramic cover 5 and the coil bobbin 6 are respectively accommodated in the housing and arranged up and down; the load leading-out terminal 2 are arranged at a top of the ceramic cover 5; the coil leading-out terminals 3 are arranged at a bottom of the coil bobbin 6; the head of the auxiliary leading-out terminals 4 are arranged at the top of the ceramic cover 5, the tails of the auxiliary leading-out terminals 4 extend to the bottom end of the housing 1 by bypassing lateral sides of the ceramic cover 5 and the coil bobbin 6; and the connecting parts 41 of the auxiliary leading-out terminals 4 are at the tails of the auxiliary leading-out terminals.

In one embodiment, each of the auxiliary leading-out terminals 4 includes an auxiliary static contact 20 and a first connecting sheet 43; the auxiliary static contact 20 is fixed at the top of the ceramic cover 5; one end of the first connecting sheet 43 is connected with the auxiliary static contact 20 at a top end of the ceramic cover 5, and a middle section of the first connecting sheet 43 is bent so that the other end of the first connecting sheet 43 serves as the tail of the auxiliary leading-out terminal and thereby is at the bottom end of the housing 1, so as to form the connecting part.

In one embodiment, the connecting part 41 of the auxiliary leading-out terminal is bent to be U-shaped from the other end of the first connecting sheet 43.

Figure 2:
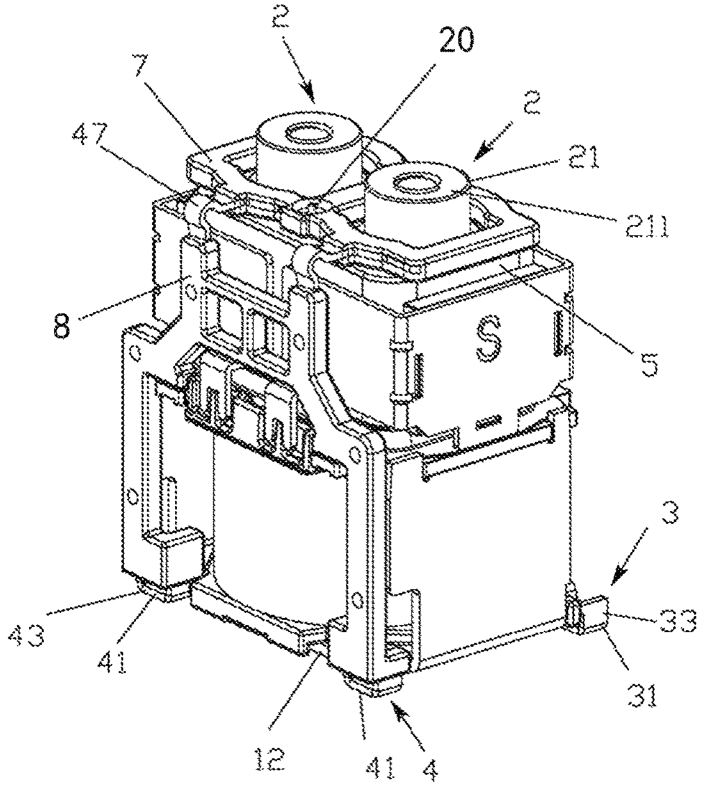
FIG. 2 is a perspective schematic view of the high-voltage DC relay when an outer casing is removed according the embodiment of the present disclosure.
Figure 3:
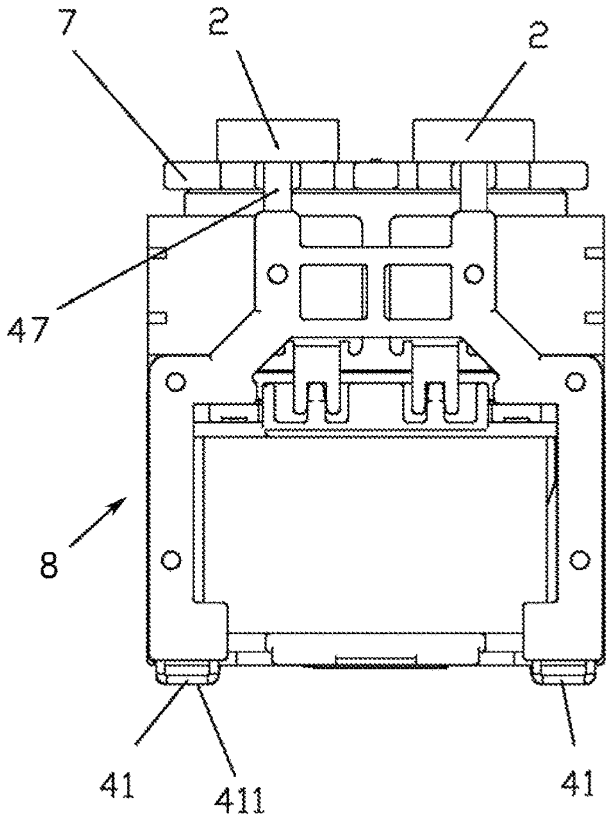
FIG. 3 is a front view of the high-voltage DC relay when the outer casing is removed according to the embodiment of the present disclosure.
Figure 4:
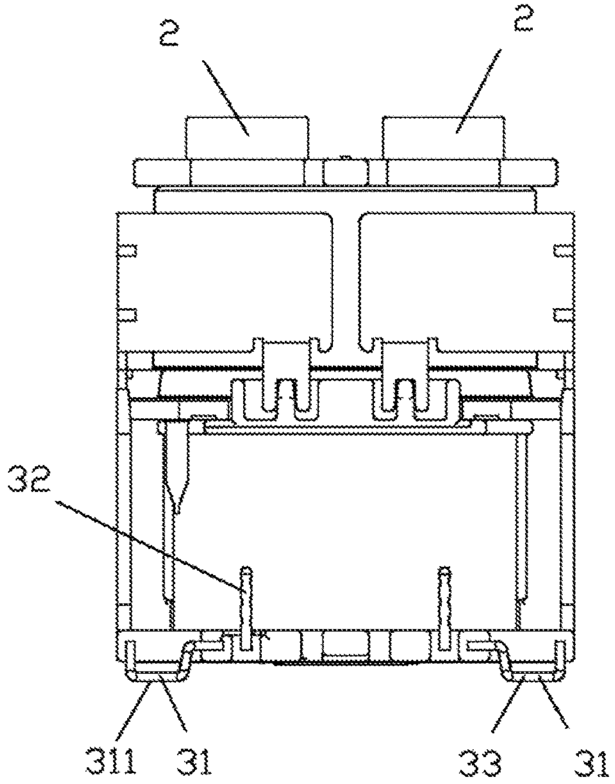
FIG. 4 is a rear view of the high-voltage DC relay when the outer casing is removed according to the embodiment of the present disclosure.
Figure 5:
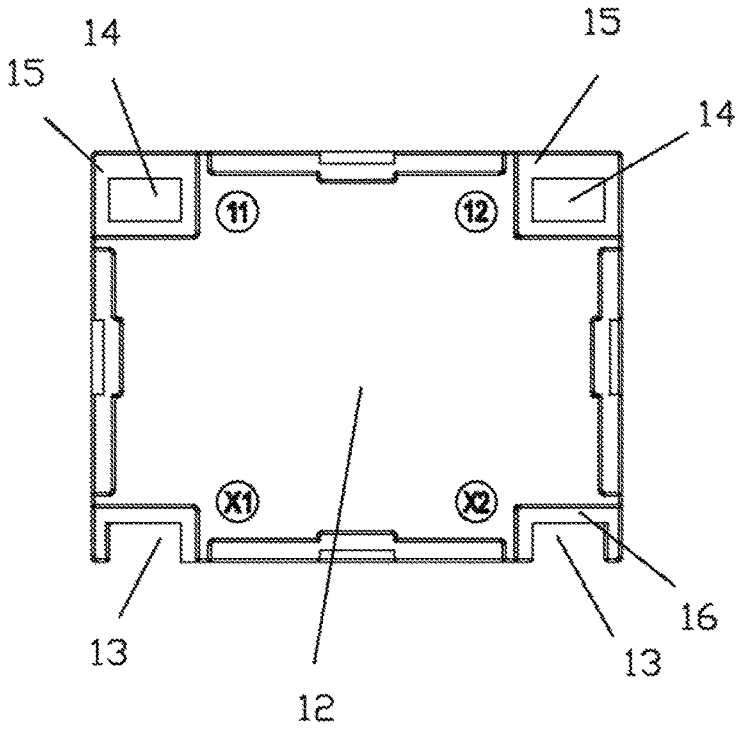
FIG. 5 is a bottom view of the high-voltage DC relay when the outer casing is removed and coil leading-out terminal and auxiliary leading-out terminal are not installed therein according to the embodiment of the present disclosure.
Figure 6:
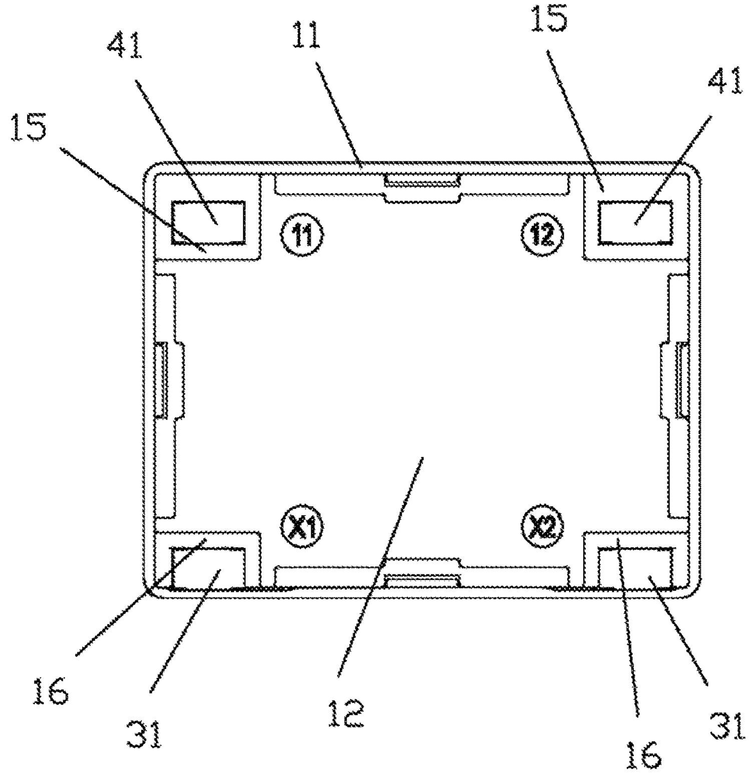
FIG. 6 is a top view of the high-voltage DC relay according to the embodiment of the present disclosure.
Figure 7:
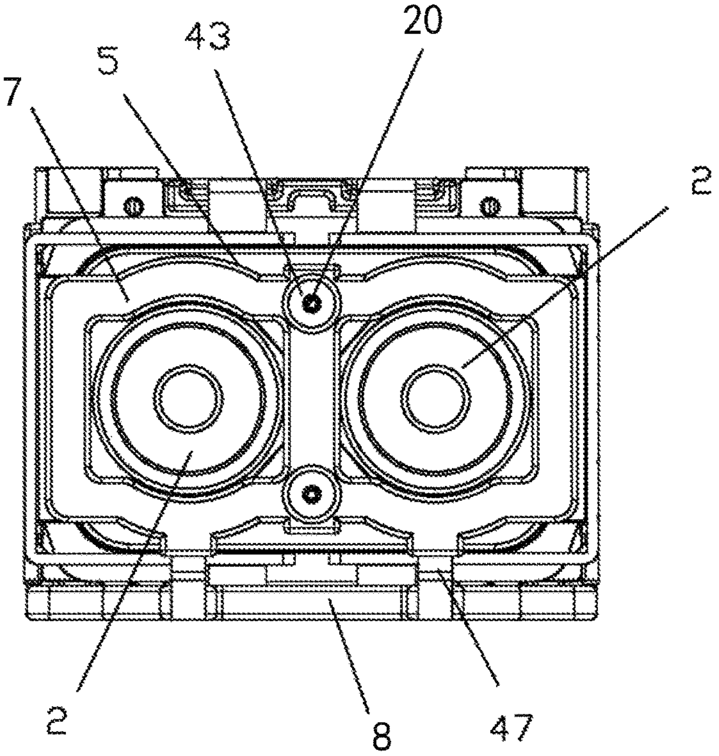
FIG. 7 is a top view of the high-voltage DC relay when the outer casing is removed according to the embodiment of the present disclosure.
Figure 8:
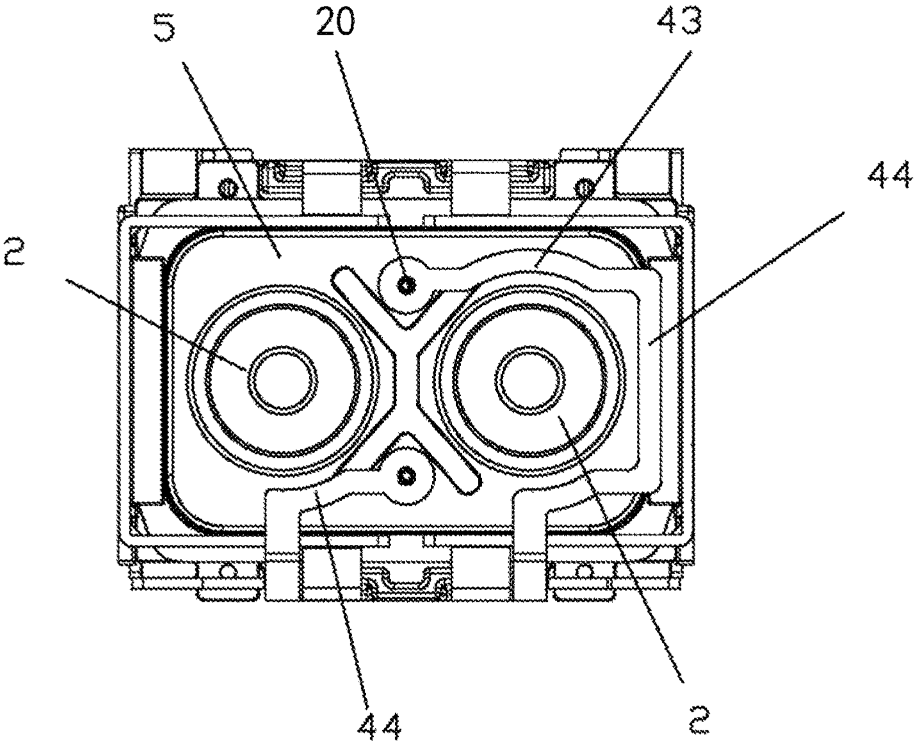
FIG. 8 is a top view of the high-voltage DC relay when the housing and first injection pieces are removed according to the embodiment of the present disclosure.
Figure 9:
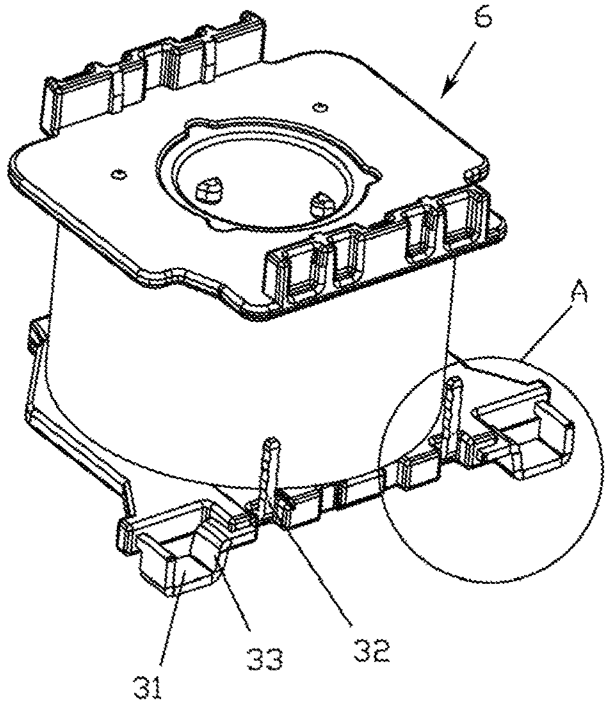
FIG. 9 is a schematic view showing the cooperation of a coil bobbin with the coil leading-out terminal according to the embodiment of the present disclosure.
Figure 10:
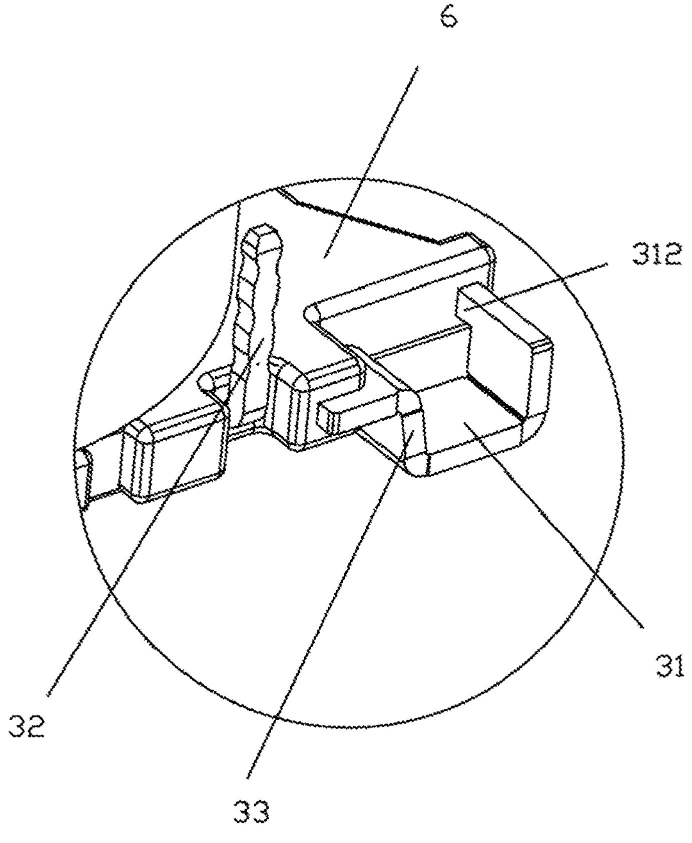
FIG. 10 is a schematic enlarged view of part A in FIG. 9.
Figure 11:
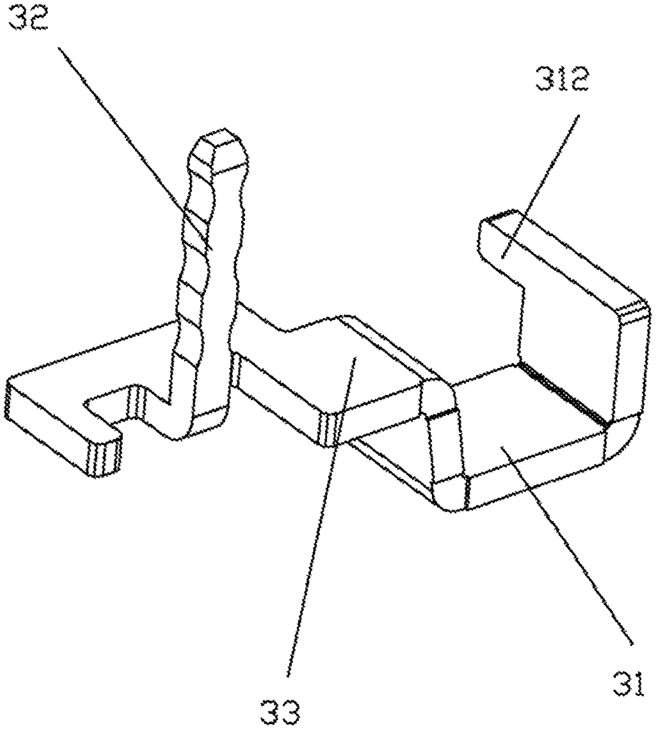
FIG. 11 is a schematic structural view of the coil leading-out terminal according to the embodiment of the present disclosure.
Figure 12:
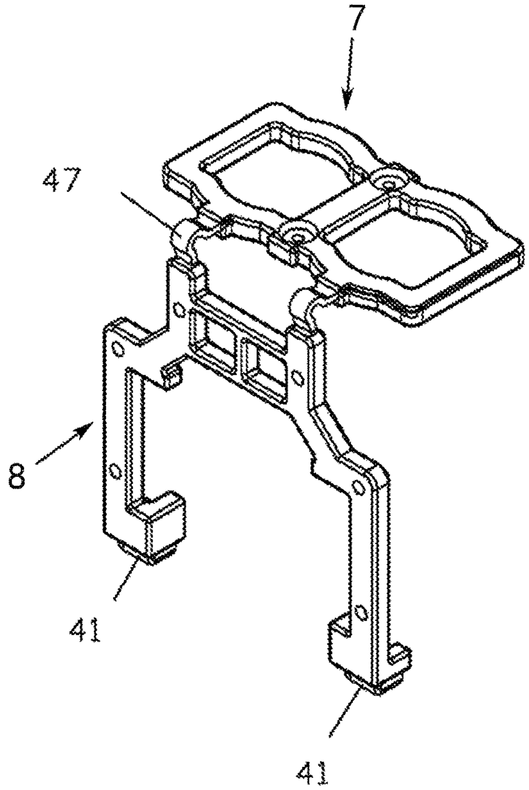
FIG. 12 is a schematic view showing the cooperation of a first connecting sheet of the auxiliary leading-out terminal with the first injection pieces and second injection pieces according to the embodiment of the present disclosure.
Figure 13:
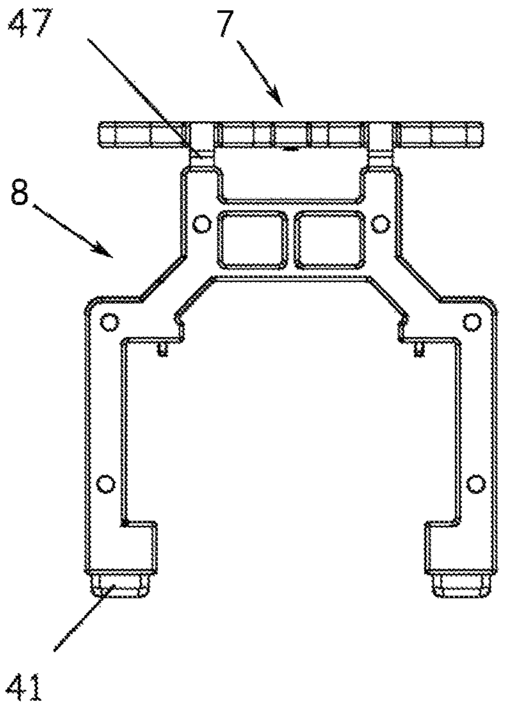
FIG. 13 is a front view showing the cooperation of the first connecting sheet of the auxiliary leading-out terminal with the first injection pieces and the second injection pieces according to the embodiment of the present disclosure.
Figure 14:
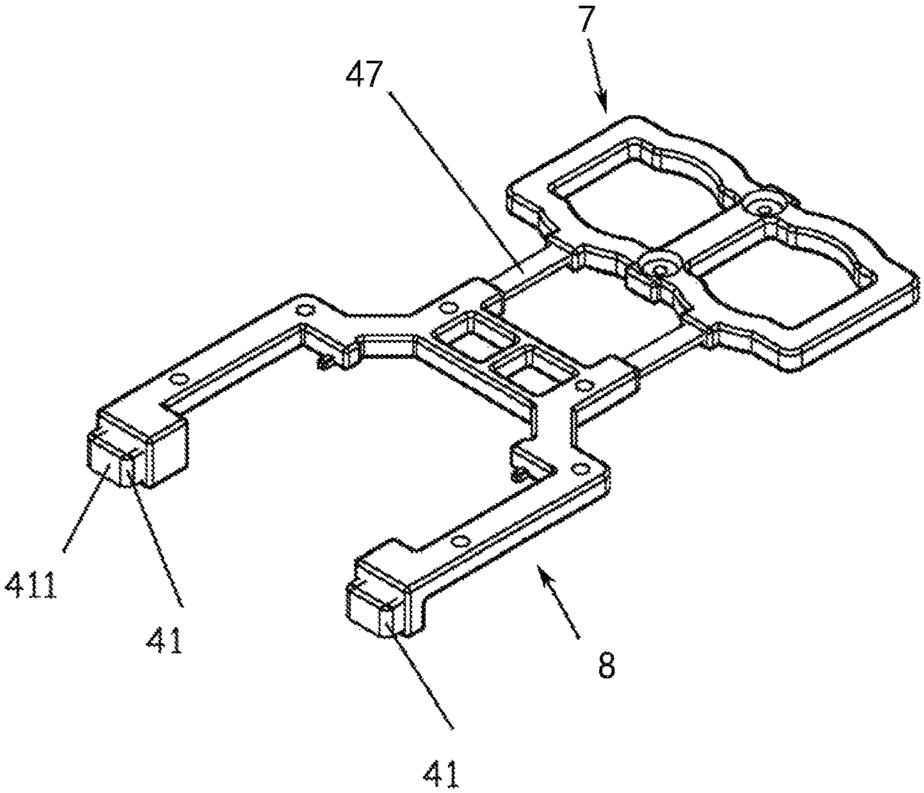
FIG. 14 is a schematic view showing the cooperation of the first connecting sheet of the auxiliary leading-out terminal with the first injection pieces and the second injection pieces when a connecting section of the first connecting sheet is not bent to be arc-shaped according to the embodiment of the present disclosure.
Figure 15:
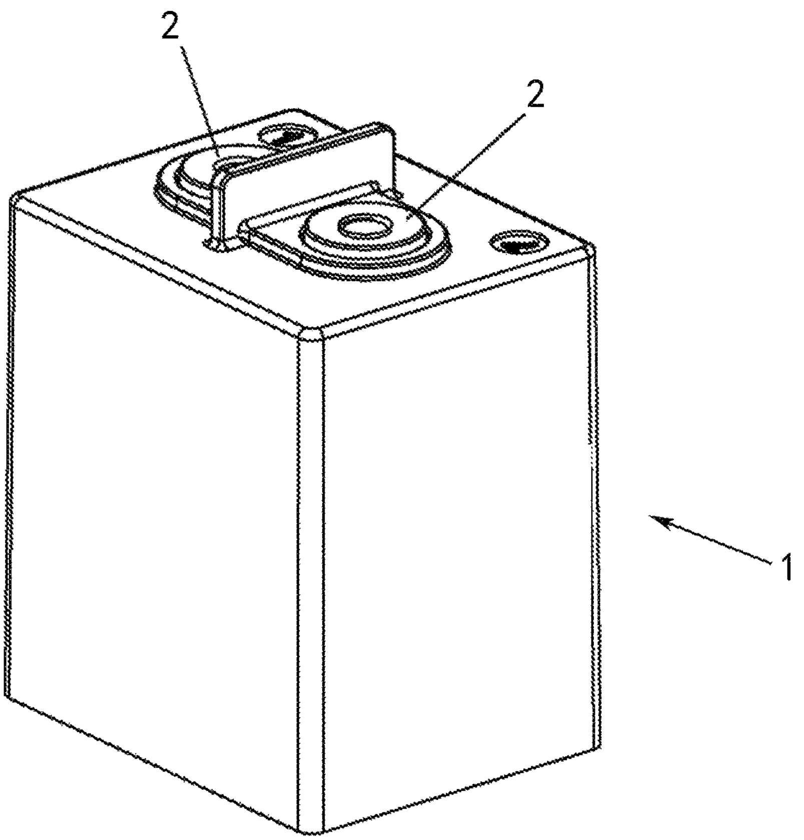
FIG. 15 is a perspective schematic view of the high-voltage DC relay according to the embodiment of the present disclosure.
Figure 16:
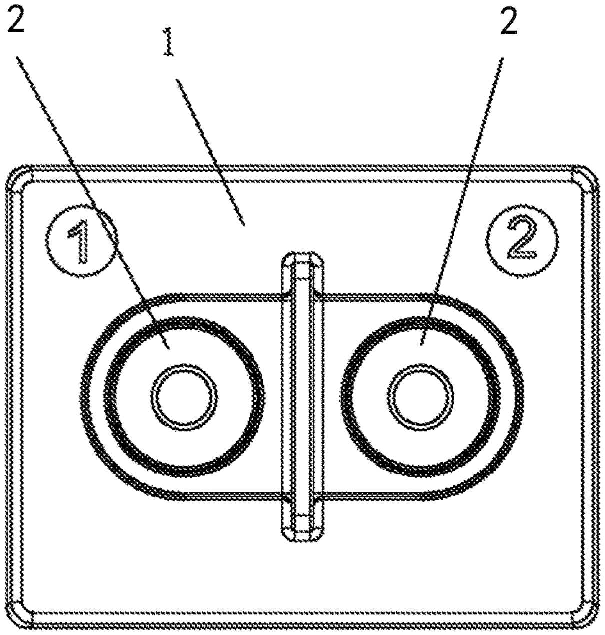
FIG. 16 is a top view of the high-voltage DC relay according to the embodiment of the present disclosure.

As shown in FIG. 2 and FIG. 3, the high-voltage DC relay of the present disclosure further includes a first injection piece 7 in which a part 44 of the first connecting sheet 43 above the top end of the ceramic cover 5 is covered, and a second injection piece 8 in which a part of the first connecting sheet 43 at the lateral sides of the ceramic cover 5 and the coil bobbin 6.

In one embodiment, the second injection piece 8 also covers the top ends of two side walls of the connecting part 41 in the U-shaped of the auxiliary leading-out terminal.

In one embodiment, a part of the first connecting sheet 43 that is exposed outside the first injection piece 7 and the second injection piece 8 and is between the first injection piece 7 and the second injection piece 8 is a connecting section 47, and the connecting section 47 is bent to be arc-shaped. An arc angle is designed at a position of the auxiliary leading-out terminal 4 close to the load leading-out terminal 2 to prevent the auxiliary leading-out terminal 4 from being forced during welding, and directly act on the auxiliary contact to play a buffering effect. The load leading-out terminal 2 can be increased in width and height to address such drawback that the sealing effect of the ceramic cover is poor due to a thermal stress caused by the thermal expansion of the load leading-out terminal 2 during welding.

In one embodiment, each of the coil leading-out terminals 3 includes a winding post 32 and a second connecting sheet 33, and the winding post 32 is integrally connected to one end of the second connecting sheet 33, and the other end of the second connecting sheet 33 is bent to be U-shaped so as to constitute a connecting part 31 of the coil leading-out terminal; the coil bobbin 6 covers one end of the second connecting sheet 33.

In one embodiment, a protrusion 312 extends and is provided at the top of the one closer to the outside of the two side walls of the U-shaped connecting part 31 of the coil leading-out terminal 3, and the coil bobbin 6 covers a tail end of the protrusion 312.

In one embodiment, the housing 1 is composed of the outer casing 11 and a bottom plate 12; in the bottom plate 12, a receding notch 13 is provided at an exposed position corresponding to the connecting part 31 of the coil leading-out terminal 3, and a receding through hole 14 is provided at an exposed position corresponding to the connecting part 41 of the auxiliary leading-out terminal 4.

In one embodiment, on a bottom surface of the bottom plate 12, a receding slot 15 is provided on a periphery of the receding through hole 14, and a receding slot 16 is provided on a periphery of the receding notch 13.

According to the high-voltage DC relay convenient for quick assembly of the present disclosure, the connecting part 21, 31, 41 of the load leading-out terminal 2, the coil leading-out terminals 3 and the auxiliary leading-out terminals 4 are respectively designed as welding planes 211, 311, 411 that can realize electrical connection with the corresponding external components through quick welding. The structure of the present disclosure enables the high voltage terminal (load) and low voltage terminal (coil and auxiliary contacts) of the relay to be assembled by means of the quick welding, which is favorable for assembly line production, and can realize the maximum efficiency of assembling and welding production, and has the characteristics of simple structure, low production cost, and reliable electrical connection.

According to the high-voltage DC relay convenient for quick assembly of the present disclosure, the connecting parts 41 of the auxiliary leading-out terminals 4 are bent to be U-shaped, the connecting parts 31 of the coil leading-out terminals 3 are bent to be U-shaped, and the two side walls of the U-shaped connecting part or extensions of the side walls are injection molded with the second injection piece or the coil bobbin. The structure of the present disclosure can greatly enhance the strength of the connecting part, and make the connection between the connecting part and the external component when welding more reliable.

According to the high-voltage DC relay convenient for quick assembly of the present disclosure, one end of the first connecting sheet 43 is connected to the auxiliary static contact 20 at the top of the ceramic cover 5, and the middle section of the first connecting sheet 43 is bent so that the other end of the first connecting sheet serves as the tail of the auxiliary leading-out terminal and is at the bottom end of the housing 1; and by means of the injection piece, the part of the first connecting sheet 43 above the top end of the ceramic cover is covered in the first injection piece 7, and the part of the first connecting sheet 43 outside the lateral sides of the ceramic cover 5 and the coil bobbin 6 is covered in the second injection piece 8. The structure of the present disclosure can avoid drawbacks of low-voltage wiring disorder and unsightly appearance.

In addition, according to the DC relay in the prior art, the auxiliary leading-out terminal of the auxiliary static contacts are installed on the ceramic cover. In order to meet the needs for installation, a part of the load leading-out terminal of the DC relay used to realize electrical connection with external components is arranged at the top, and a part of the auxiliary leading-out terminal used to realize the electrical connection with the external components is arranged at the bottom, as such, it is required to guide the auxiliary leading-out terminal from the top of the replay to the bottom of the relay, so that there is an insulation between a high voltage (load leading-out terminal) and a low voltage (auxiliary leading-out terminal) occurred at the top of the ceramic cover. On the other hand, it is also required to dispense glue after the main static contact (i.e., the load leading-out terminal) is welded to the ceramic cover, in the prior art, a retaining wall is made at the periphery of an opening of the main static contact on the outer casing, so as to form a dispensing slot; however, this method is to sleeve the outer casing and then dispense the glue, in this way, the glue is easy to cover the exposed load leading-out terminal, so that there is a circumstance that the part covered by the glue is not conducted electrically when the load leading-out terminal is connected to the external components such as a copper bar.

The present disclosure also provides a high-voltage DC relay with auxiliary contacts. Such improvement of the structure can not only meet the needs for insulation between the high voltage (load leading-out terminal) and the low voltage (auxiliary leading-out terminal), but also realize dispensing glue before covering the outer casing after the static contacts are welded to the ceramic cover, so as to make the glue not to cover the exposed load leading-out terminal, and reduce the process difficulty.

The following technical solution is adopted by the present disclosure to solve the technical problems. A high-voltage DC relay with auxiliary contacts includes a housing, a ceramic cover, a coil bobbin, main static contacts and auxiliary static contacts. The ceramic cover and the coil bobbin are distributed up and down and received within the housing. The two main static contacts are installed at the top wall of the ceramic cover at a first gap, and upper ends of the two main static contacts are exposed from the housing so as to realize electrical connection from the top of the relay to an external load. Two auxiliary static contacts are installed on the top wall of the ceramic cover at a second gap and are isolated from the two main static contacts by means of the ceramic cover. The two auxiliary static contacts are also led out through the auxiliary leading-out terminal respectively. A first injection piece with two opening parts is arranged on an upper surface of a top wall of the ceramic cover; two opening parts are respectively sleeved at the periphery of the two main static contacts and enclose a dispensing slot; and the parts of the two auxiliary leading-out terminal on the upper surface of the top wall of the ceramic cover are covered therein when the first injection piece is injection molded, so as to achieve insulation and isolation between the auxiliary leading-out terminal of the auxiliary static contacts and the main static contacts.

In one embodiment, the two auxiliary leading-out terminals are bent from the top end of the sides of the ceramic cover and the coil bobbin, further to the bottom end of the housing, and are exposed downward from the bottom of the housing, so as to realize the electrical connection of the bottom of the relay with the external components.

In one embodiment, a projection of a connecting line between the two auxiliary static contacts on a horizontal plane intersects with a projection of a connecting line between the two main static contacts on the horizontal plane, and the connecting line between the two auxiliary static contacts passes through an approximate middle point of the connecting line between the two main static contacts.

In one embodiment, the projection of the connecting line between the two auxiliary static contacts on the horizontal plane perpendicularly intersects with the projection of the connecting line between the two main static contacts on the horizontal plane.

In one embodiment, on a top end of the top wall of the ceramic cover, a groove for increasing a creepage distance between the two main static contacts is arranged at a position corresponding to the first gap between the two main static contacts, and a middle cross bar corresponds to the groove.

In one embodiment, ribs protruding downward are arranged on the bottom of the middle cross bar. The ribs are clearance fit in the grooves of the ceramic cover to realize an initial setting of the first injection piece on the ceramic cover and increase the creepage distance between the two main static contacts.

In one embodiment, the two auxiliary static contacts are respectively located at the two ends of the middle cross bar, and first through hole from which the two auxiliary static contacts respectively protrude upwardly are arranged at the two ends of the middle cross bar, and one end of each of the two auxiliary leading-out terminals are fitted into the corresponding first through hole of the first injection piece and is fixed to the corresponding auxiliary static contact by the way of soldering.

In one embodiment, the two auxiliary leading-out terminals are in strip-sheet shape, and a second through hole is arranged at one end of each of the two auxiliary leading-out terminal, and the two auxiliary static contacts respectively pass through the corresponding second through holes and are welded and fixed to one end of the corresponding auxiliary leading-out terminal by the way of soldering.

In one embodiment, the ends of the two auxiliary leading-out terminals are arranged on both sides of the connecting line of the two main static contacts; and one of the two auxiliary terminals is half-wrapped by one side of the connecting line of the two main static contacts behind the other one of the two main static contacts, and is bent to the position on the other side of the connecting line of the two main static contacts rightly facing to the one of the main static contacts, and then bent to the lateral side of the ceramic cover and the coil bobbin; the other of the two auxiliary leading-out terminal extends from the other side of the connecting line of the two main static contacts to the position rightly facing to the other main static contact, and then bent to the lateral sides of the ceramic cover and the coil bobbin.

In one embodiment, the part of the two auxiliary leading-out terminal at the lateral side of the ceramic cover and the coil bobbin is also covered by a second injection piece.

In one embodiment, the second injection piece includes two symmetrical second sub-injection pieces.

In one embodiment, a connecting injection piece is also connected between the two second sub-injection pieces.

Compared with the prior art, the advantageous effects of the present disclosure are that:

1. The first injection piece with two opening parts is arranged on an upper surface of a top wall of the ceramic cover; two opening parts of the first injection piece are respectively sleeved at the periphery of the two main static contacts and enclose a dispensing slot after the main static contacts are welded to the ceramic cover; and the parts of the two auxiliary leading-out terminal on the upper surface of the top wall of the ceramic cover are covered therein when the first injection piece is injection molded, so as to achieve insulation and isolation between the auxiliary leading-out terminal of the auxiliary static contacts and the main static contacts. Such structure of the present disclosure, after fitting the first injection piece to the two auxiliary static contacts and the auxiliary leading-out terminal thereof, on one hand may realize the insulation and isolation between the auxiliary static contacts and the auxiliary leading-out terminal thereof and the main static contact (between the high voltage and the low voltage), on the other hand, may use the dispensing slot formed by the first injection piece to realize dispensing glue before covering the outer casing after the static contacts are welded to the ceramic cover, so as to control the glue not to cover the exposed load leading-out terminal, and reduce the process difficulty, and ensure there is not a circumstance that the part covered by the glue is not conducted electrically when the load leading-out terminal is connected to the external components such as a copper bar.

2. The parts of the two auxiliary leading-out terminal on the upper surface of the top wall of the ceramic cover are covered therein when the first injection piece is injection molded, the part of the two auxiliary leading-out terminal at the lateral side of the ceramic cover and the coil bobbin is also covered by the second injection piece, and a connecting injection piece is also connected between the two second sub-injection pieces. The structure of the present disclosure can avoid drawbacks of low-voltage wiring disorder and unsightly appearance.

The present disclosure will be further described in detail below with reference to the drawings and embodiments;

however, the high-voltage DC relay with auxiliary contacts of the present disclosure is not limited to the embodiments.

Referring to FIGS. 15 to 32, the high-voltage DC relay with auxiliary contacts of the present disclosure includes a housing 1, a ceramic cover 5, a coil bobbin 6, main static contacts 2 and auxiliary static contacts 20. The ceramic cover 5 and the coil bobbin 6 are distributed up and down and received within the housing 1. The two main static contacts 2 are installed at the top wall of the ceramic cover 5 at a first gap, and upper ends of the two main static contacts 2 are exposed from the housing 1 to achieve electrical connection of the top of the relay with an external load, for example, a copper bar. The two auxiliary static contacts 20 are installed at the top wall 51 of the ceramic cover 5 at a second gap, and are insulated from the two main static contacts 2 by means of the ceramic cover 5. The auxiliary leading-out terminal 4 includes an auxiliary static contact 20 and a first connecting sheet 43. The two auxiliary static contacts 20 are respectively bent from the top end of the ceramic cover 5 to the lateral side of the ceramic cover 5 and the coil bobbin 6 and then bent to the bottom end of the housing 1 by means of the first connecting sheet 43, and exposed downward from the bottom end of the housing 1 so as to realize electrical connection of the bottom of the relay with the external components such as the copper bar. A first injection piece 7 with two opening parts 71 are installed on the upper surface of the top wall 51 of the ceramic cover 5. The first injection piece 7 surrounds the two main static contacts 2, for example, the first injection piece 7 may have a rectangular frame, and the first injection piece 7 in the rectangular frame is provided with a middle cross bar 72, thereby forming two opening parts 71. The two opening parts 71 are respectively sleeved at the periphery of the two main static contacts 2. The two main static contacts 2 are separated by the middle cross bar 72. The first injection piece 7 and the middle cross bar 72 enclose a dispensing slot, so as to dispense the glue after the main static contacts 2 are welded to the ceramic cover 5. The part 44 of the two auxiliary leading-out terminal 4 on the upper surface of the top wall of the ceramic cover is covered therein when the first injection piece 7 is injection molded, so as to realize the insulation and isolation between the auxiliary leading-out terminal 4 of the auxiliary static contacts 20 and the main static contacts 2. The part of the first connecting sheet 43 exposed outside the first injection piece 7 and the second injection piece 8 and between the first injection piece 7 and the second injection piece 8 is a connecting section 47, and the connecting section 47 is bent to be arc-shaped.

Figure 21:
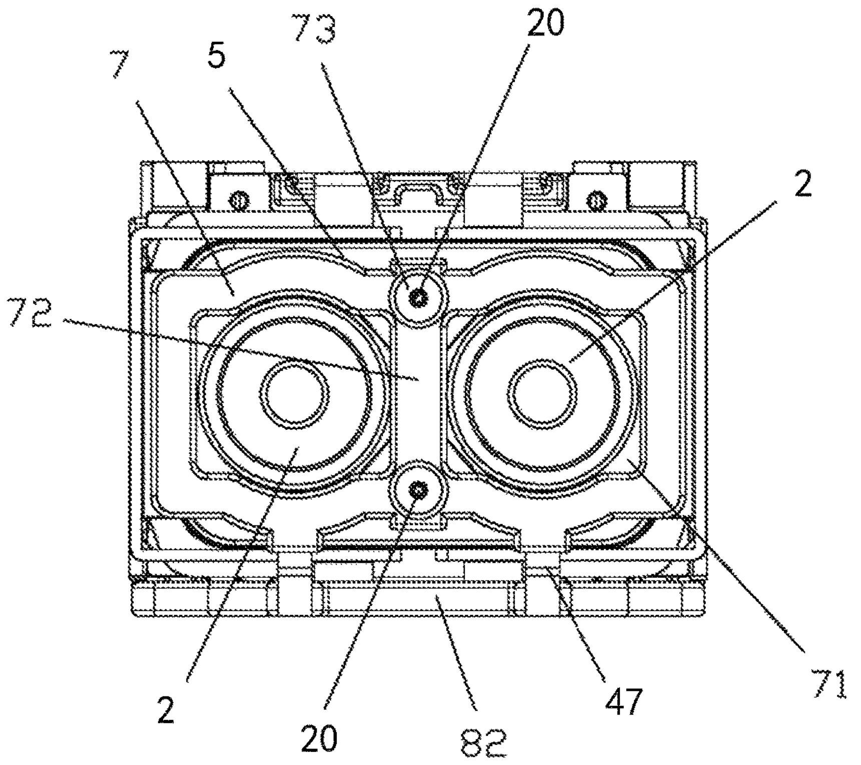
FIG. 21 is a top view of the high-voltage DC relay when the cashing is removed according to the embodiment of the present disclosure.

In one embodiment, as shown in FIG. 21, a projection of a connecting line between the two auxiliary static contacts 20 on a horizontal plane intersects with a projection of a connecting line between the two main static contacts 2 on the horizontal plane, and the connecting line between the two auxiliary static contacts 20 passes through an approximate middle point of the connecting line between the two main static contacts 2.

In one embodiment, the projection of the connecting line between the two auxiliary static contacts 20 on the horizontal plane perpendicularly intersects with the projection of the connecting line between the two main static contacts 2 on the horizontal plane.

Figure 17:
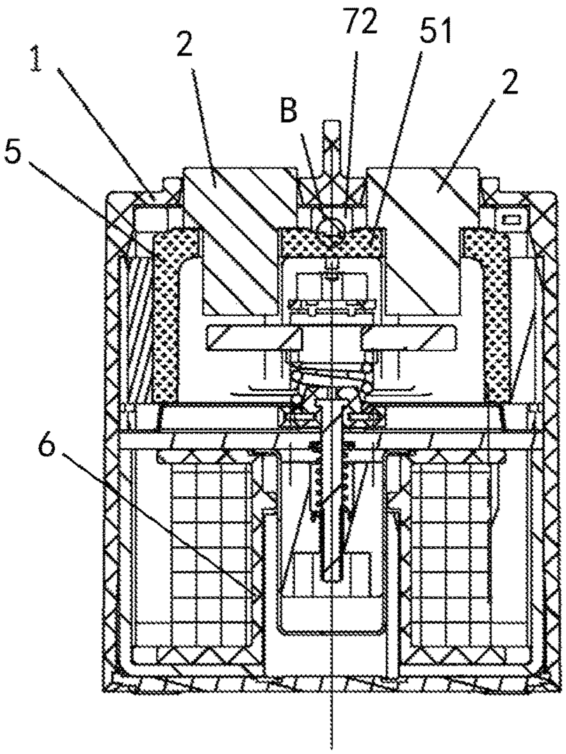
FIG. 17 is a sectional view of the high-voltage DC relay cut along a connecting line of two main static contacts according to the embodiment of the present disclosure.
Figure 18:
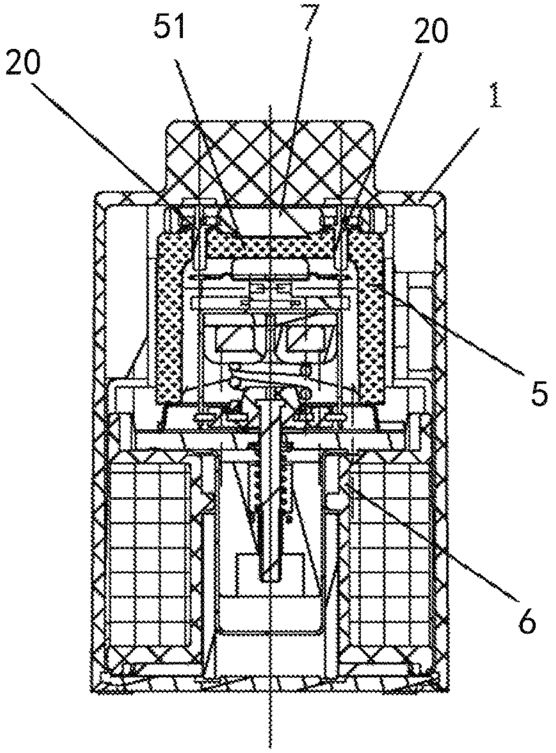
FIG. 18 is a sectional view of the high-voltage DC relay cut along a connecting line of two auxiliary static contacts according to the embodiment of the present disclosure.
Figure 19:
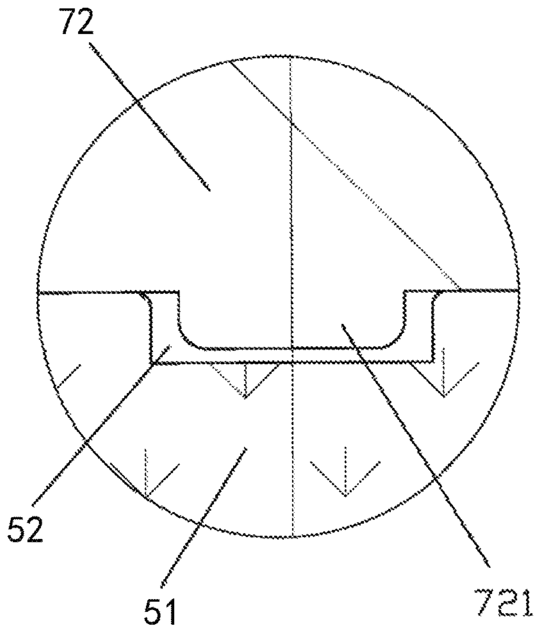
FIG. 19 is a schematic enlarged view of part B in FIG. 17.

In one embodiment, as shown in FIG. 17 and FIG. 19, on a top end of the top wall 51 of the ceramic cover 5, a groove 52 for increasing a creepage distance between the two main static contacts 2 is arranged at a position corresponding to the first gap between the two main static contacts 2, and a middle cross bar 72 corresponds to the groove 52.

In one embodiment, ribs 721 protruding downward are arranged on the bottom of the middle cross bar 72. The ribs 721 are clearance fit in the groove 52 of the ceramic cover 5 to realize an initial positioning of the first injection piece 7 on the ceramic cover 5 and increase the creepage distance between the two main static contacts 2, and isolate and block direct penetration through the groove 52 at the high voltage.

Figure 20:
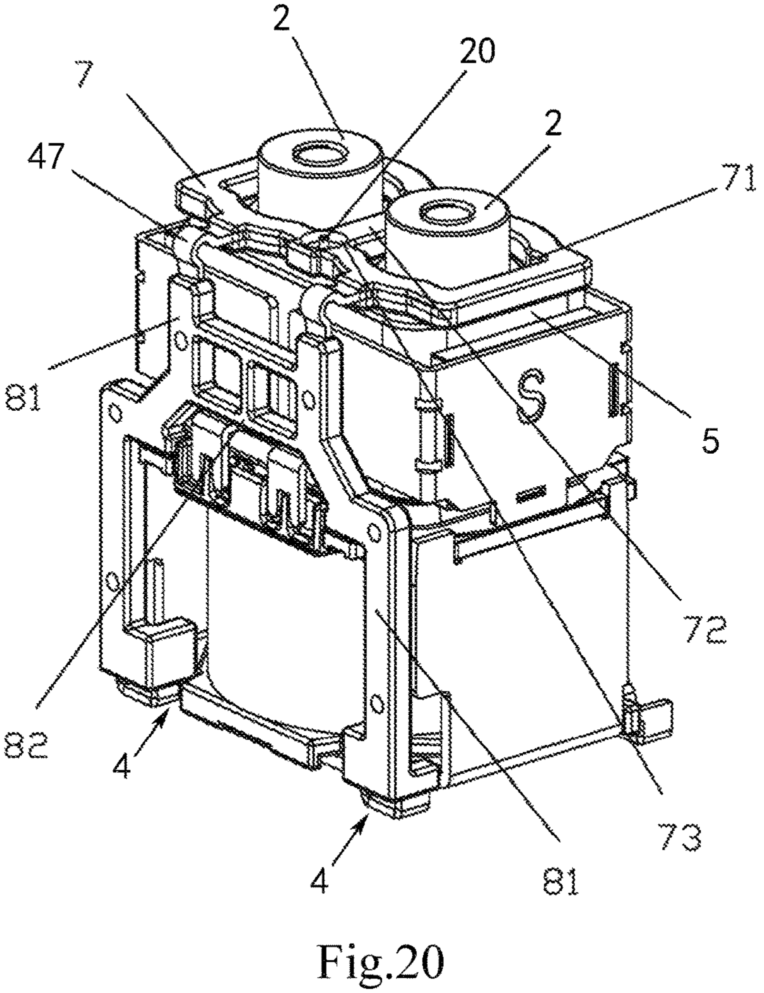
FIG. 20 is a perspective schematic view of the high-voltage DC relay when the outer casing is removed according to the embodiment of the present disclosure.
Figure 22:
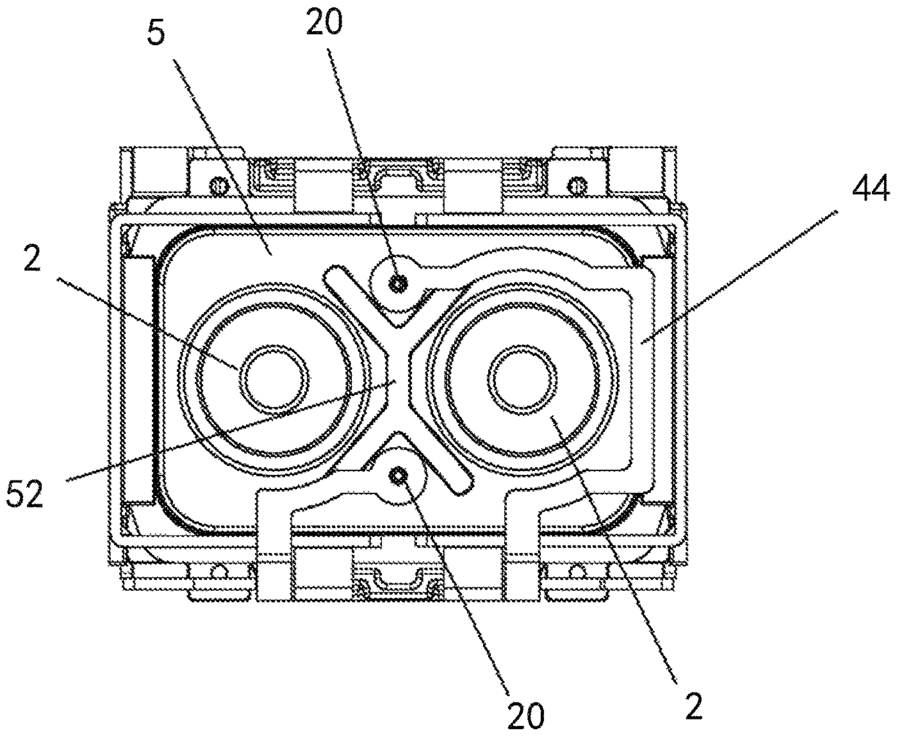
FIG. 22 is a top view of the high-voltage DC relay when the outer casing and the first injection piece are removed according to the embodiment of the present disclosure.
Figure 23:
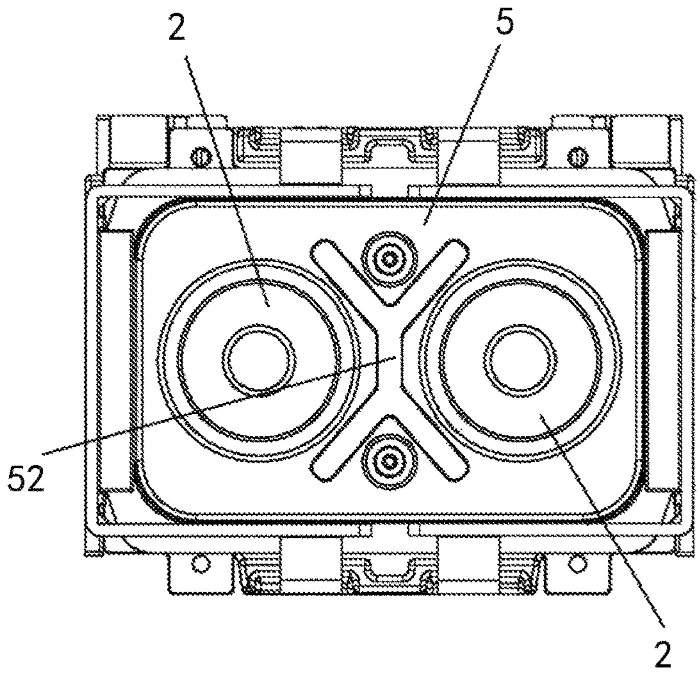
FIG. 23 is a top view of the high-voltage DC relay when the outer casing, the first injection piece and auxiliary leading-out terminal are removed according to the embodiment of the present disclosure.
Figure 24:
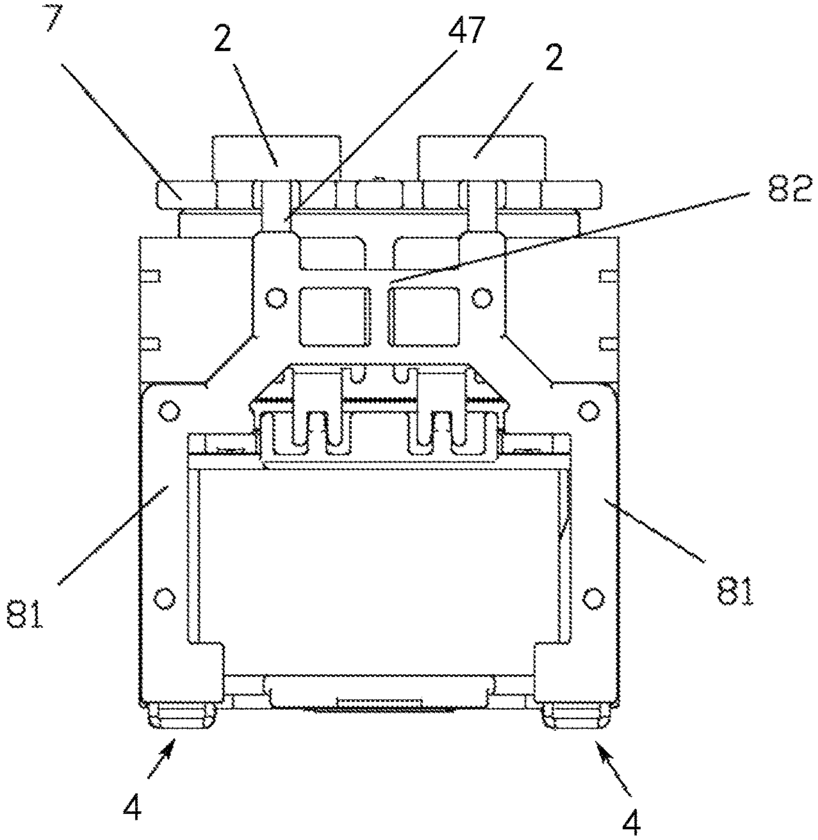
FIG. 24 is a front view of the high-voltage DC relay when the outer casing is removed according to the embodiment of the present disclosure.
Figure 25:
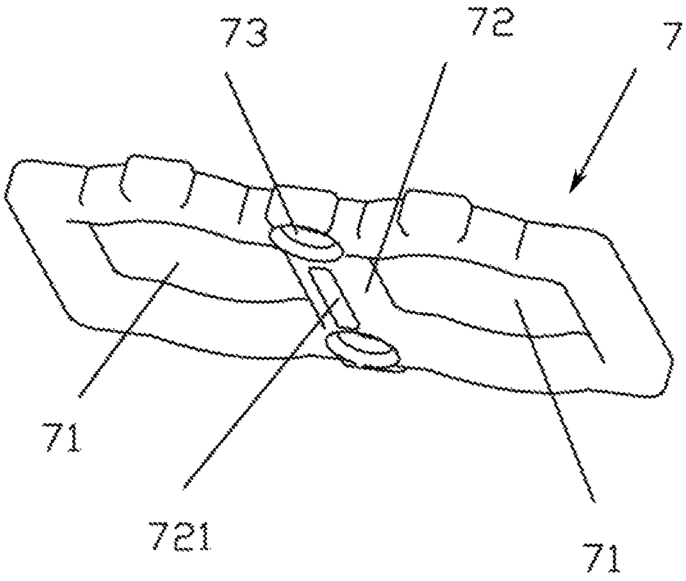
FIG. 25 is a perspective schematic view of the first injection piece according to the embodiment of the present disclosure.
Figure 26:
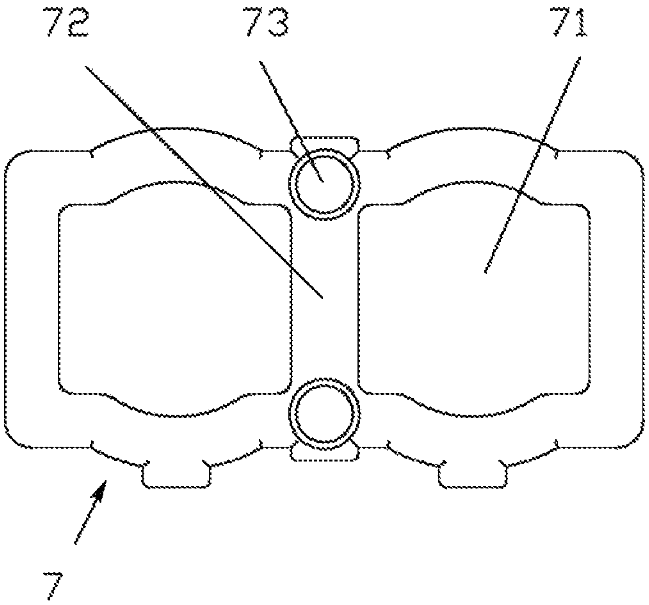
FIG. 26 is a top view of the first injection piece according to the embodiment of the present disclosure.
Figure 27:
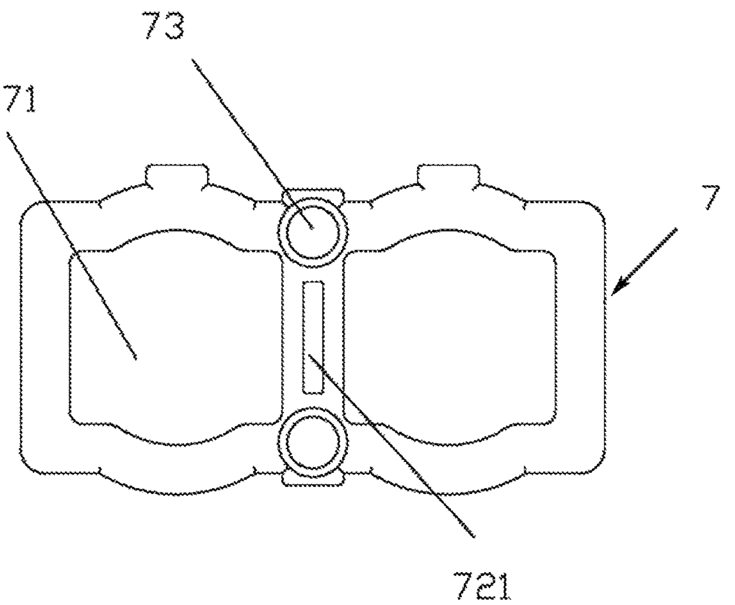
FIG. 27 is a bottom view of a first injection piece according to the embodiment of the present disclosure.
Figure 28:
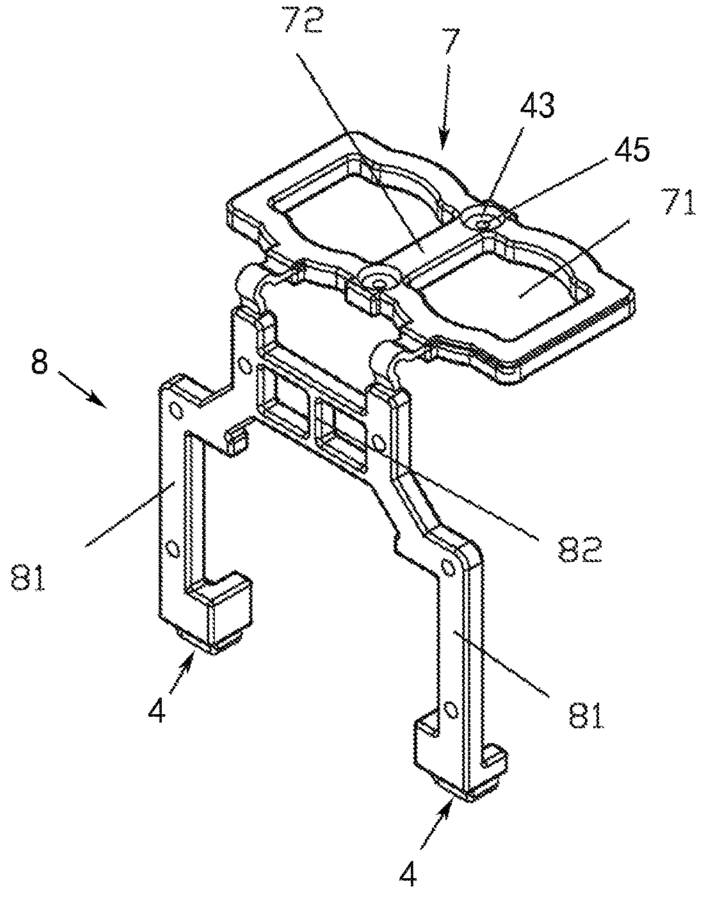
FIG. 28 is a perspective schematic view showing the cooperation of the auxiliary leading-out terminal with the first injection piece and the second injection piece according to the embodiment of the present disclosure.
Figure 29:
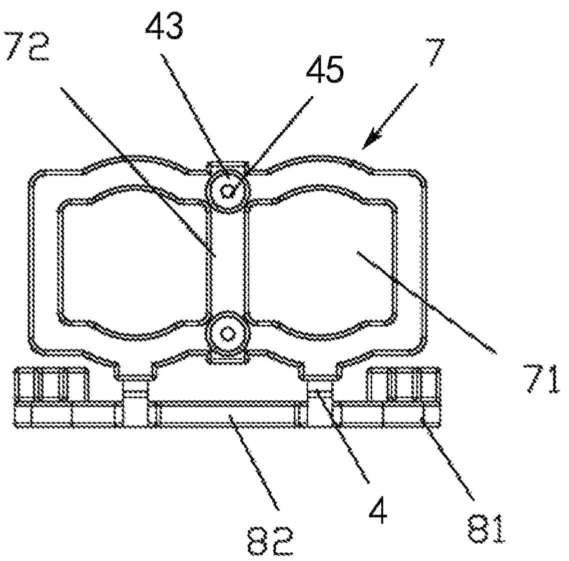
FIG. 29 is a top view showing the cooperation of the auxiliary leading-out terminal with the first injection piece and the second injection piece according to the embodiment of the present disclosure.
Figure 30:
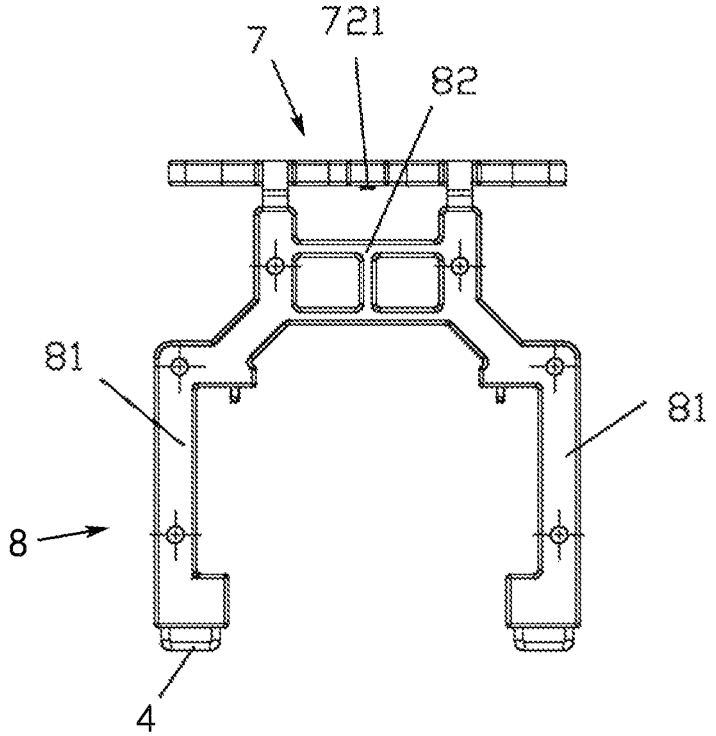
FIG. 30 is a front view showing the cooperation of the auxiliary leading-out terminal with the first injection piece and the second injection piece according to the embodiment of the present disclosure.
Figure 31:
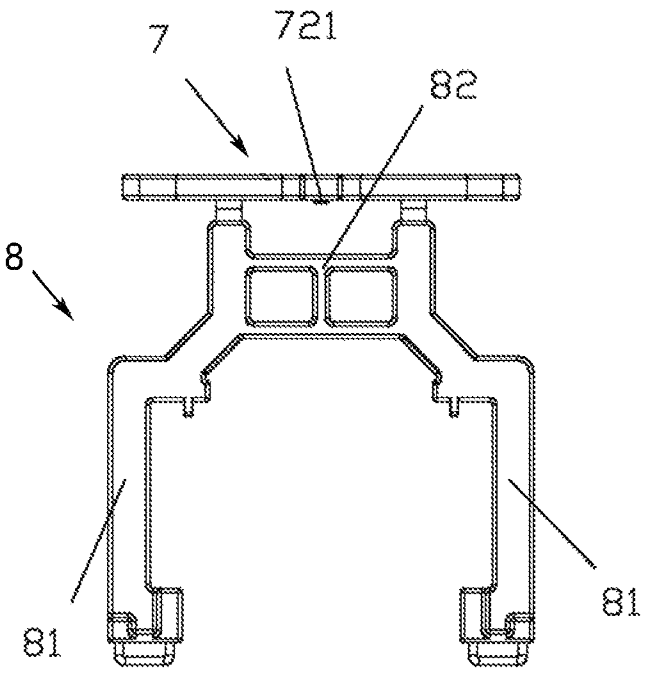
FIG. 31 is a rear view showing the cooperation of the auxiliary leading-out terminal with the first injection piece and the second injection piece according to the embodiment of the present disclosure.
Figure 32:
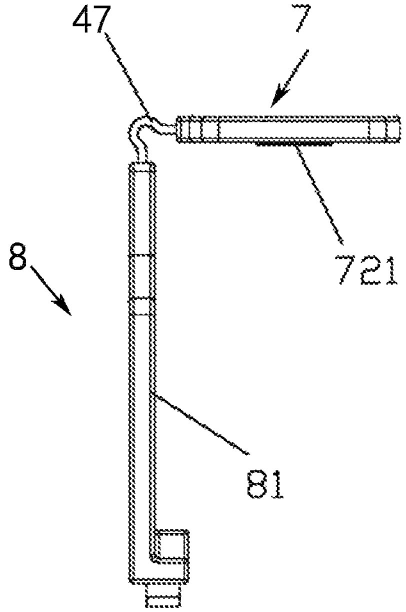
FIG. 32 is a side view showing the cooperation of the auxiliary leading-out terminal with the first injection piece and the second injection piece according to the embodiment of the present disclosure.
Figure 33:
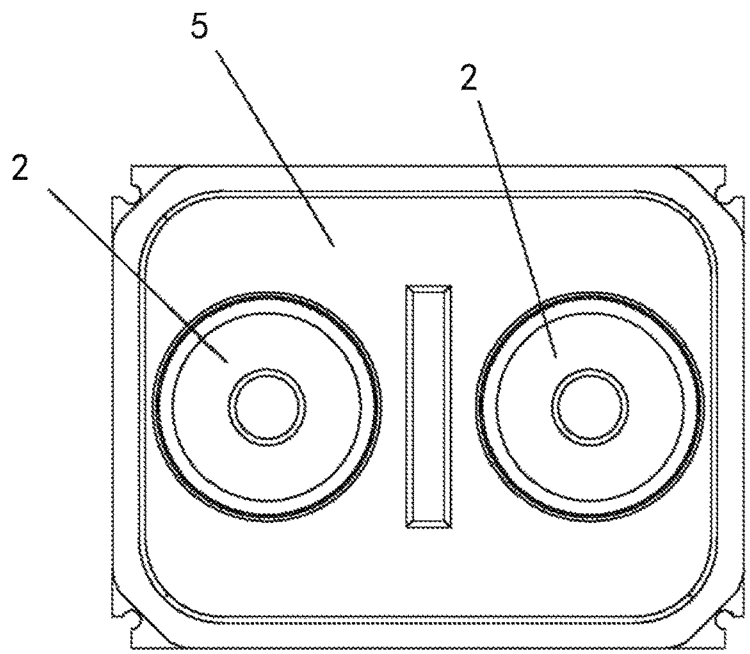
FIG. 33 is a top view of a partial configuration of the high-voltage DC relay according to the embodiment of the present disclosure.
Figure 34:
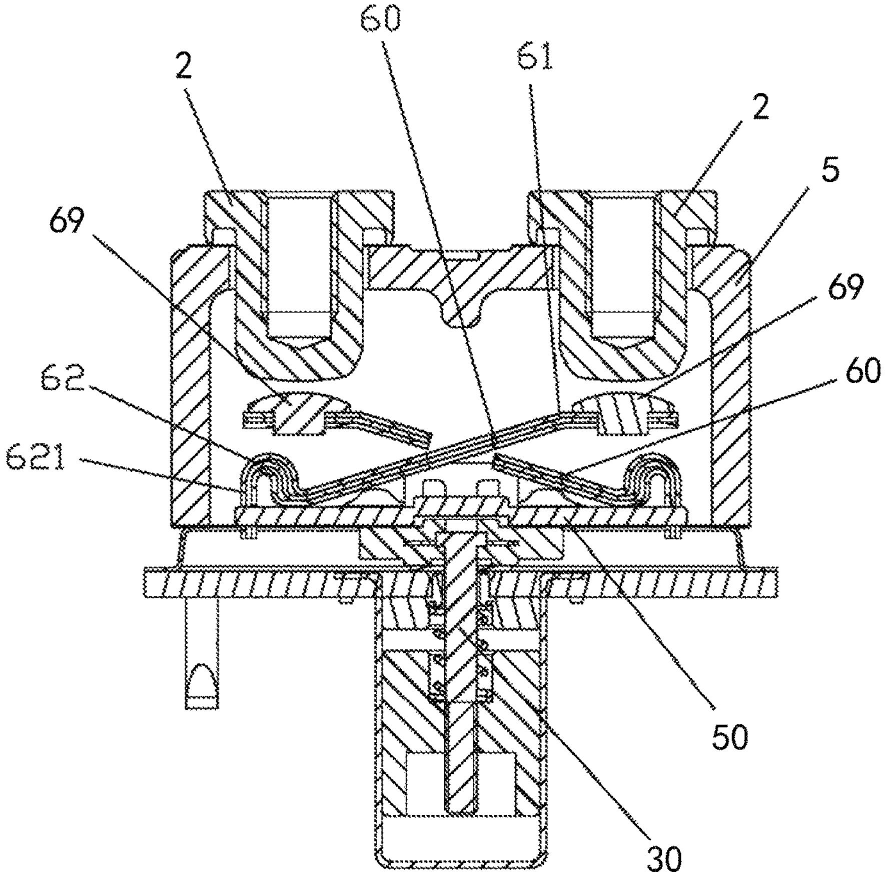
FIG. 34 is a sectional view of a partial configuration of the high-voltage DC relay according to the embodiment of the present disclosure.
Figure 35:
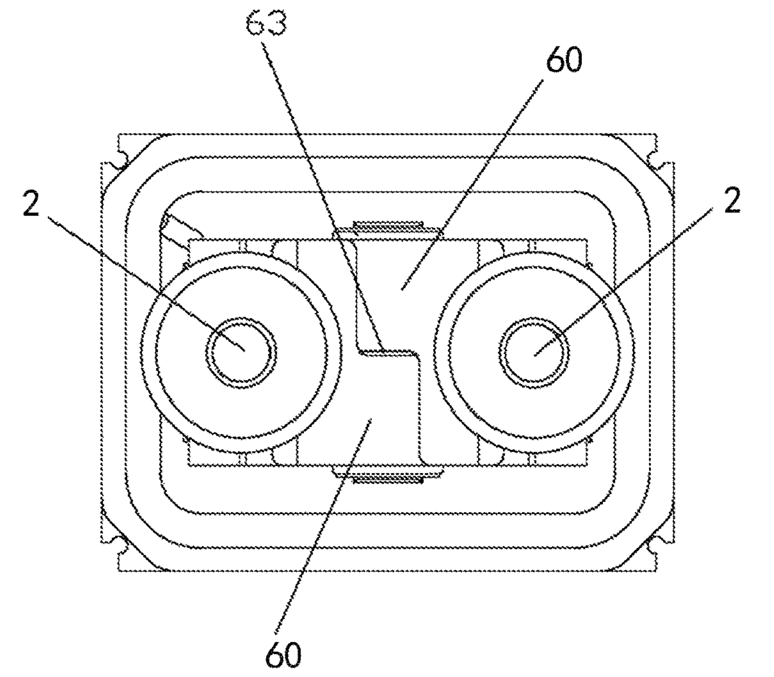
FIG. 35 is a top view of a partial configuration with a ceramic cover removed according to the embodiment of the present disclosure.
Figure 36:
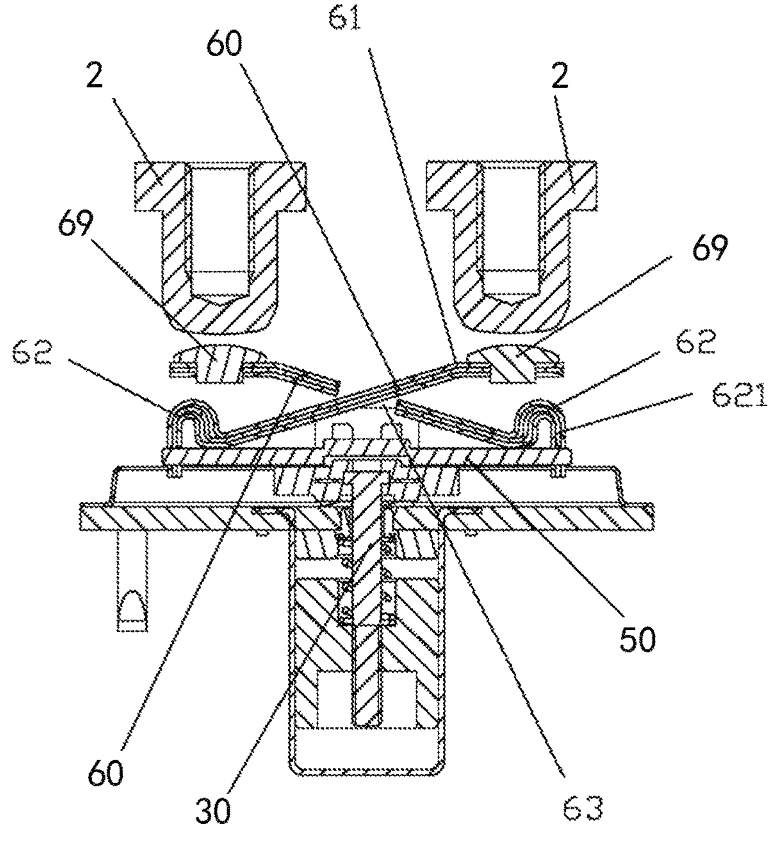
FIG. 36 is a sectional view of the high-voltage DC relay in which a main movable contact is disconnected with a main static contact according to the embodiment of the present disclosure.

In one embodiment, as shown in FIG. 20 and FIG. 22, the two auxiliary static contacts 20 are respectively located at the two ends of the middle cross bar 72, and first through hole 73 from which the two auxiliary static contacts 20 respectively protrude upwardly is respectively arranged at the two ends of the middle cross bar 72, and one end of each of the two auxiliary leading-out terminal 4 is fitted into the corresponding first through hole 73 of the first injection piece and is fixed to the corresponding auxiliary static contact 20 by the way of soldering; the other ends of the two auxiliary leading-out terminal 4 serve as the connecting part exposed from the bottom end of the housing 1, so as to realize the electrical connection of the bottom of the relay with the external component such as a copper bar.

In one embodiment, the two auxiliary leading-out terminal 4 are in strip-sheet shape, and a second through hole 45 is arranged at one end of each of the two auxiliary leading-out terminal 4 (see FIG. 28, FIG. 29), and the two auxiliary static contacts 20 respectively pass through the corresponding second through holes 45 and are welded and fixed to one end of the corresponding auxiliary leading-out terminal 4 by the way of soldering.

In one embodiment, as shown in FIG. 20 and FIG. 22, the ends of the two auxiliary leading-out terminal 4 are arranged on both sides of the connecting line of the two main static contacts 2; and one of the two auxiliary terminals 4 is half-wrapped by one side of the connecting line of the two main static contacts 2 behind the other one of the two main static contacts 2, and is bent to the position on the other side of the connecting line of the two main static contacts 2 rightly facing to the one of the main static contacts 2, and then bent to the lateral side of the ceramic cover 5 and the coil bobbin 6; the other of the two auxiliary leading-out terminal 4 extends from the other side of the connecting line of the two main static contacts 2 to the position rightly facing to the other main static contact 2, and then bent to the lateral sides of the ceramic cover 5 and the coil bobbin 6.

In one embodiment, the part of the two auxiliary leading-out terminal 4 at the lateral side of the ceramic cover 5 and the coil bobbin 6 is also covered by a second injection piece 8.

In one embodiment, the second injection piece 8 includes two symmetrical second sub-injection pieces 81. A connecting injection piece 82 is also connected between the two second sub-injection pieces 81.

According to the high-voltage DC replay with auxiliary contacts, a first injection piece 7 with two opening parts is arranged on an upper surface of a top wall 51 of the ceramic cover 5; the first injection piece 7 is provided with the middle cross bar 72 so as to form two opening parts 71, and the two opening parts 71 respectively sleeved at the periphery of the two main static contacts 2 and enclose a dispensing slot after the main static contacts 2 are welded to the ceramic cover 5; and the parts 44 of the two auxiliary leading-out terminal 4 on the upper surface of the top wall of the ceramic cover are covered therein when the first injection piece 7 is injection molded, so as to achieve insulation and isolation between the auxiliary leading-out terminal 4 of the auxiliary static contacts 20 and the main static contacts 2. Such structure of the present disclosure, after fitting the first injection piece 7 to the two auxiliary static contacts 5 and the auxiliary leading-out terminal 4 thereof, on one hand may realize the insulation and isolation between the auxiliary static contacts 20 and the auxiliary leading-out terminal 4 thereof and the main static contact 2 (between the high voltage and the low voltage), on the other hand, may use the dispensing slot formed by the first injection piece 7 to realize dispensing glue before covering the outer casing 1 after the main static contacts 2 are welded to the ceramic cover 5, so as to control the glue not to cover the exposed load leading-out terminal, and reduce the process difficulty, and ensure there is not a circumstance that the part covered by the glue is not conducted electrically when the load leading-out terminal is connected to the external components such as a copper bar.

According to the high-voltage DC relay with auxiliary contacts of the present disclosure, the parts 44 of the two auxiliary leading-out terminal 4 on the upper surface of the top wall of the ceramic cover 5 are covered therein when the first injection piece 7 is injection molded, the part of the two auxiliary leading-out terminal 4 at the lateral side of the ceramic cover 5 and the coil bobbin 6 is also covered by the second injection piece 81, and a connecting injection piece 82 is also connected between the two second sub-injection pieces 81. The structure of the present disclosure can avoid drawbacks of low-voltage wiring disorder and unsightly appearance.

In addition, a high-voltage DC relay in the prior art adopts a movable spring direct-acting (also called solenoid direct-acting) structure. A contact part of the high-voltage DC relay includes two main static contacts (i.e., the load leading-out terminal) and a moving assembly. The moving assembly includes a movable spring part and a push rod assembly. The movable spring part is bridge-fitted between the two main static contacts and mounted on the top of the push rod assembly. Due to the reciprocating movement of the push rod assembly, the two main movable contacts of the movable spring part contact with or separate from the two main static contacts, respectively, whenever they are in contact, current flows in from one of the main static contacts and flows out of the other main static contact through the movable spring part. With the continuous development of the relay application field, the performance requirements of the relay are increasing. As for the high-voltage DC relay, it is desired to have a certain capability of resistance to short-circuit and anti-adhesion. However, the direct-acting high-voltage DC relay in the prior art still have the disadvantages of insufficient resistance to short-circuit and insufficient anti-adhesion.

An object of the present disclosure is to overcome the shortcomings of the prior art and provide a direct-acting high-voltage DC relay, which through structural improvement, has great capability of the resistance to short-circuit and the anti-adhesion, and has the characteristics of a simple structure and convenient for production and low manufacturing cost.

According to one aspect of the present disclosure, a direct-acting high-voltage DC relay includes two main static contacts, a movable spring part bridge-fitted between the two main static contacts, and a push rod assembly connected to the movable spring part for reciprocating movement of the movable spring part. The movable spring part includes a straight sheet rigid movable spring and two flexible movable springs. The straight sheet rigid movable spring is connected to the push rod assembly so as to move along with the reciprocating movement of the push rod assembly, and has two ends respectively corresponding to below the two main static contacts, and the lower ends of the two flexible movable springs are respectively fixed on the two ends of the straight sheet rigid movable spring. The two flexible movable springs cross diagonally and extend upwards to below the corresponding ones of the respective main static contacts. The upper ends of the two flexible movable springs are respectively provided with main movable contacts to correspond to and match with the bottoms of the two main static contacts. The two flexible movable springs and the straight sheet rigid movable springs form two V-shaped structures. The V-shaped structures form upward electromagnetic force on the respective main movable contacts to resist electrodynamic repulsion force downward formed on the main movable contacts due to the short-circuit current when the main static contacts and main static contacts are closed. The two flexible movable springs intersect to form a shearing force in a horizontal direction, which can promote the main movable contact and the main static contact to move horizontally in opposite directions when they are disconnected, so as to improve the anti-adhesion capability.

According to one embodiment of the present disclosure, the main movable contact is a separate part, and is riveted and fixed on the upper end of the flexible movable spring. A first bending part allowing the upper end of the flexible movable spring to be substantially horizontal is provided on the upper part of the flexible movable spring.

According to one embodiment of the present disclosure, a second bending part in U-shaped is provided on the lower end of the flexible movable spring, and the U-shaped opening of the second bending part faces downward.

According to one embodiment of the present disclosure, a side wall of the U-shaped outer side of the second bending part of the flexible movable spring is fixed to the corresponding end of the straight sheet rigid movable spring in a substantially vertical manner.

According to one embodiment of the present disclosure, receding notches are provided in the middle of the two flexible movable springs, respectively. The receding notches of the two flexible movable springs are inserted into each other with gaps so as to allow the cross distribution of the flexible movable springs.

According to one embodiment of the present disclosure, the angle between the upper parts of the two flexible movable springs is greater than 90 degrees.

According to one embodiment of the present disclosure, the flexible movable spring is composed of a plurality of springs laminated together.

Compared with the prior art, the advantageous effects of the present disclosure are:

1. According to the present disclosure, the movable spring part includes a straight sheet rigid movable spring and two flexible movable springs. The straight sheet rigid movable spring is connected to the push rod assembly so as to move along with the reciprocating movement of the push rod assembly, and has two ends respectively corresponding to below the two main static contacts, and the lower ends of the two flexible movable springs are respectively fixed on the two ends of the straight sheet rigid movable spring. The two flexible movable springs cross diagonally and extend upwards to below the corresponding ones of the respective main static contacts. The upper ends of the two flexible movable springs are respectively provided with main movable contacts to correspond to and match with the bottoms of the two main static contacts. According to the structure of the present disclosure, the two flexible movable springs and the straight sheet rigid movable springs form two V-shaped structures. The V-shaped structures form upward electromagnetic force on the respective main movable contacts to resist electro-dynamic repulsion force downward formed on the main movable contacts due to the short-circuit current when the main static contacts are closed. On the other hand, the two flexible movable springs intersect to form a shearing force in a horizontal direction, which can promote the main movable contact and the main static contact to move in cooperation along the horizontal direction when they are disconnected, so as to improve the anti-adhesion capability. The present disclosure has good resistance to short-circuit and anti-adhesion capability, and has the characteristics of simple structure, convenient for production and low manufacturing cost.

2. According to the present disclosure, the second bending part in U-shaped is provided on the lower end of the flexible movable spring, and the U-shaped opening of the second bending part faces downward. The side wall of the U-shaped outer side of the second bending part of the flexible movable spring is fixed to the corresponding end of the straight sheet rigid movable spring in a substantially vertical manner. According to the structure of the present disclosure, after one side wall of the second bending part is fixed with the straight sheet rigid movable spring, the other side wall of the second bending part is equivalent to a retractable spring, which can enhance the elasticity of the overall movable spring, and the larger the elastic deformation is, and the stronger the anti-adhesion capability is.

3. According to the present disclosure, the second bending part is arranged at the lower end (i.e., a base) of the flexible movable spring, a distance from the main movable contact to the bending part is increased, and the flexibility of the movable spring is increased. When the electro-dynamic repulsive force is generated by the contacts through the overload current, a compression amount of the movable spring increases, and a transverse shearing force becomes larger, so that it is favorable for the breaking of the contacts and has good anti-adhesion performance; and a force arm of the movable spring becomes longer, the force subjected by the movable spring becomes smaller, so as to avoid a risk of breakage occurred at the bending position.

The present disclosure will be further described in detail below with reference to the accompanying drawings and embodiments; however, the direct-acting high voltage DC relay of the present disclosure is not limited to the embodiments.

As shown in FIGS. 33-48, a direct-acting high-voltage DC relay of the present disclosure includes two main static contacts 2, a movable spring part bridge-fitted between the two main static contacts, and a push rod assembly 30 connected to the movable spring part for reciprocating movement of the movable spring part. The two main static contacts 2 are installed on the ceramic cover 5. The movable spring part includes a straight sheet rigid movable spring 50 and two flexible movable springs 60. The straight sheet rigid movable spring 50 is connected to the push rod assembly 30 so as to move along with the reciprocating movement of the push rod assembly 30, and has two ends respectively corresponding to below the two main static contacts 2, and the lower ends of the two flexible movable springs 60 are respectively fixed on the two ends of the straight sheet rigid movable spring 50. The two flexible movable springs 60 cross diagonally and extend upwards to below the corresponding ones of the respective main static contacts 2. One of the flexible movable springs 60 is taken as an example, the lower end of the flexible movable spring 60 is fixed to one end of the straight sheet rigid movable spring 50, corresponding to below one of the main static contacts 2, and the flexible movable spring 60 extends diagonally upward to below the other one of the main static contacts 2, as such, the two flexible movable springs 60 intersect with each other. The upper ends of the two flexible movable springs 60 are respectively provided with main movable contacts 69 to correspond to and match with the bottoms of the two main static contacts 2. The two flexible movable springs 60 and the straight sheet rigid movable springs 50 form two V-shaped structures. The V-shaped structures form upward electromagnetic force F1 on the respective main movable contacts 69 to resist electro-dynamic repulsion force F2 downward formed on the main movable contacts due to the short-circuit current when the main static contacts are closed. The two flexible movable springs 60 intersect to form a shearing force F7 in a horizontal direction, which can promote the main movable contact and the main static contact to move in cooperation along the horizontal direction when they are disconnected, so as to improve the anti-adhesion capability.

Figure 37:
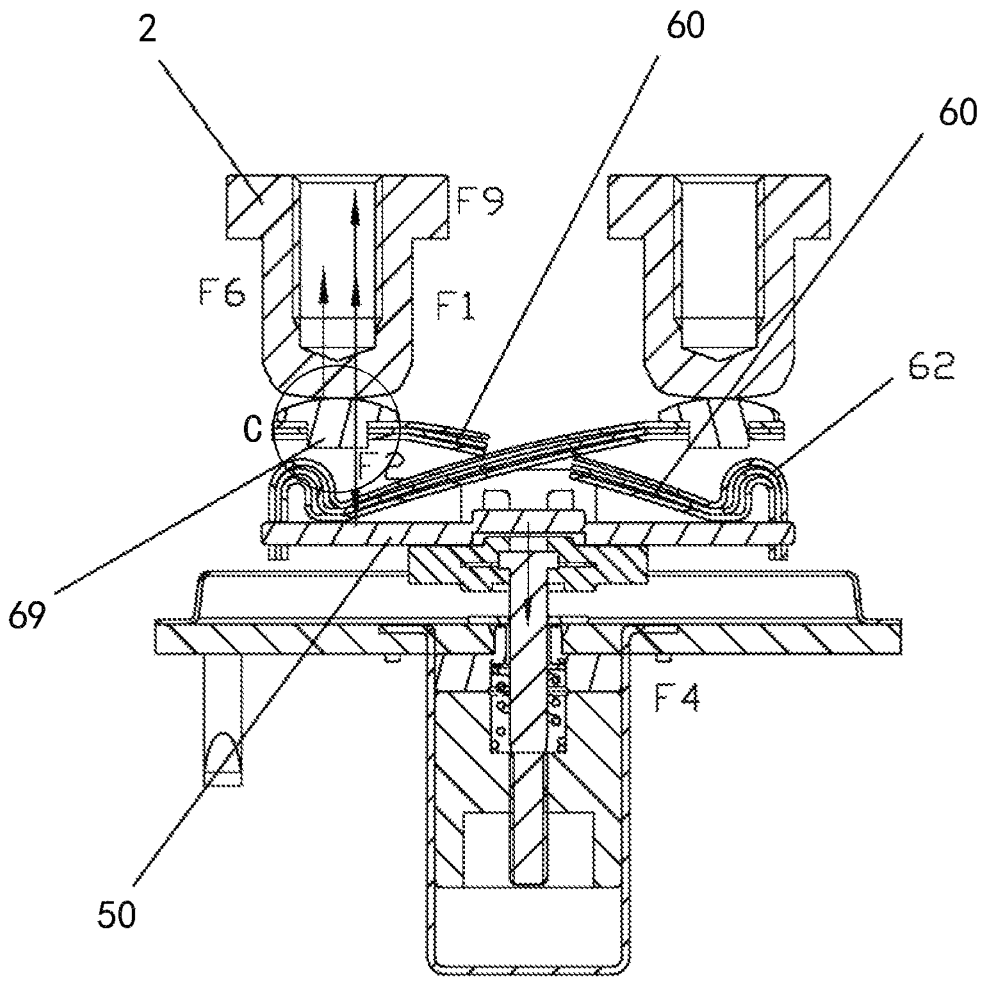
FIG. 37 is a sectional view of the high-voltage DC relay according to the present disclosure, and a schematic view showing that a force is applied when an overload current flows through the main movable contact.
Figure 38:
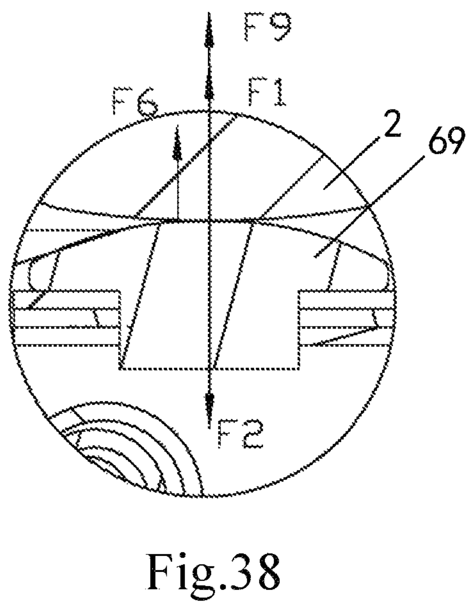
FIG. 38 is an enlarged view of part C of the main movable contact in FIG. 37.
Figure 39:
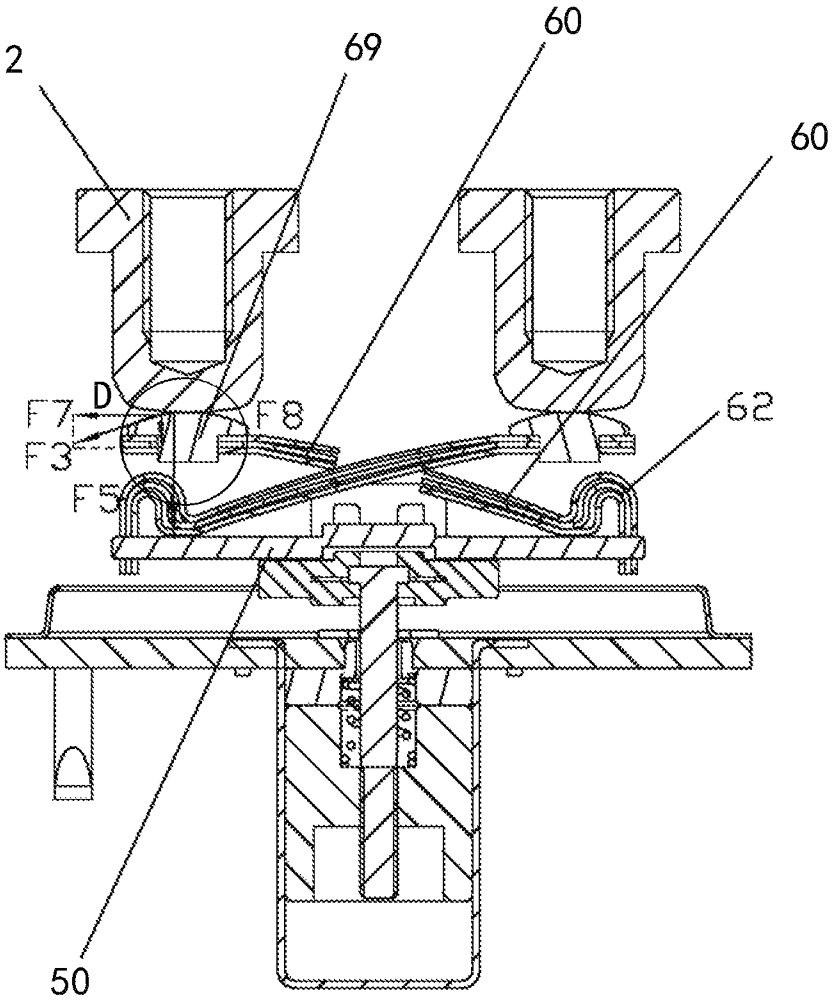
FIG. 39 is a sectional view of the high-voltage DC relay according to the embodiment of the present disclosure, and a schematic view showing that the force is applied upon the disconnection of a contact current.
Figure 40:
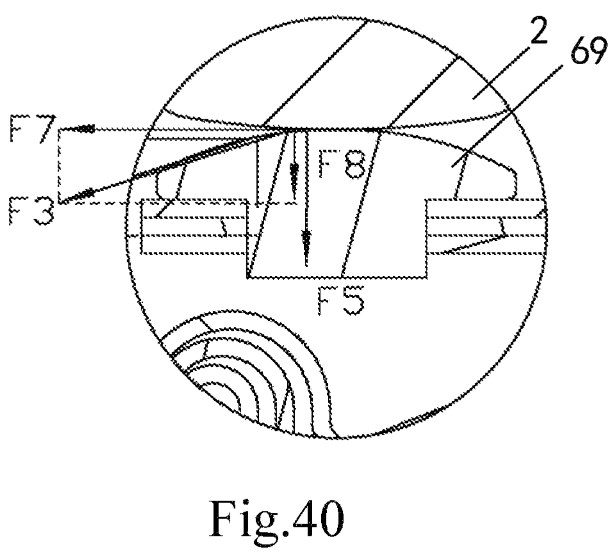
FIG. 40 is an enlarged view of part D of the main movable contact in FIG. 39.
Figure 41:
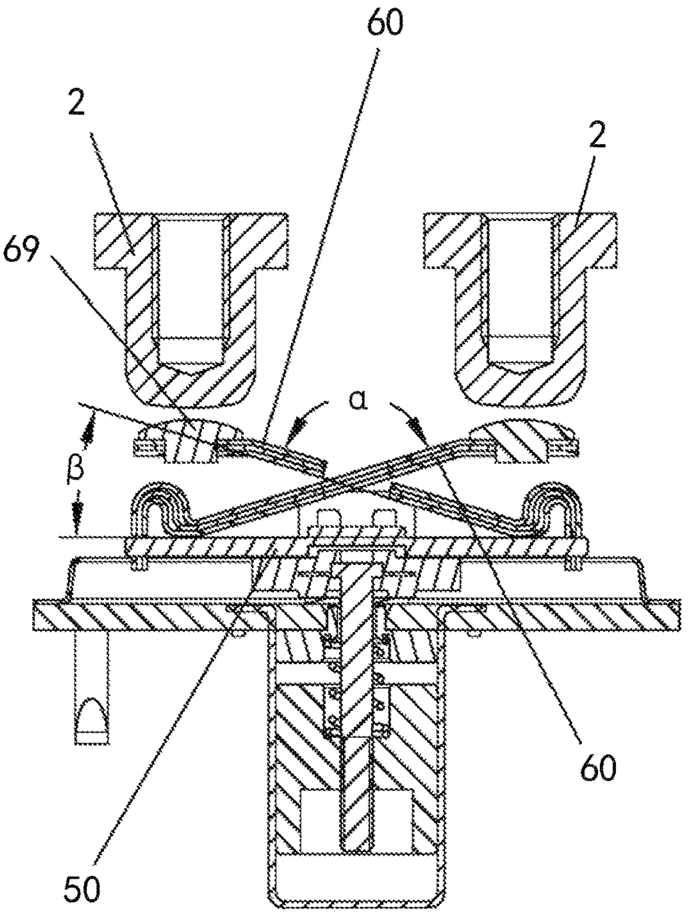
FIG. 41 is a schematic view of an included angle of two flexible movable springs in the high-voltage DC relay according to the embodiment of the present disclosure.
Figure 42:
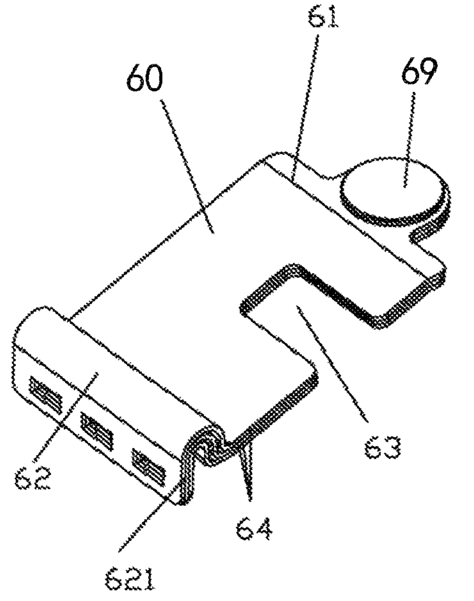
FIG. 42 is a perspective schematic view showing the cooperation of the flexible movable spring with movable contact in the high-voltage DC relay according to the embodiment of the present disclosure.
Figure 43:
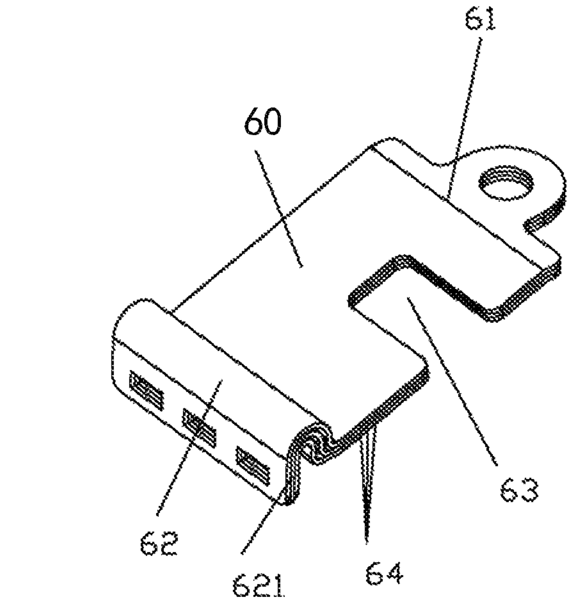
FIG. 43 is a perspective schematic view of the flexible movable spring in the high-voltage DC relay according to the embodiment of the present disclosure.
Figure 44:
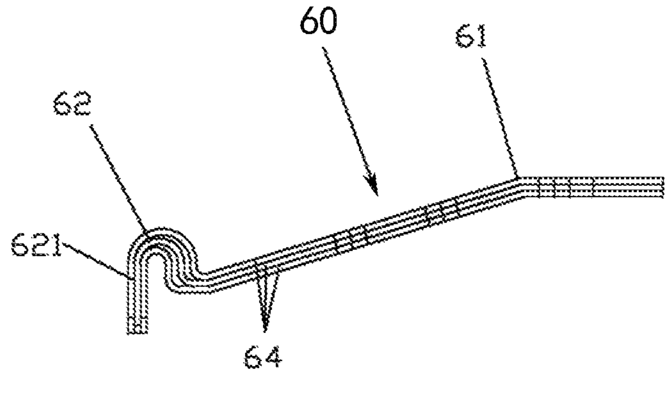
FIG. 44 is a front view of the flexible movable spring in the high-voltage DC relay according to the embodiment of the present disclosure.
Figure 45:
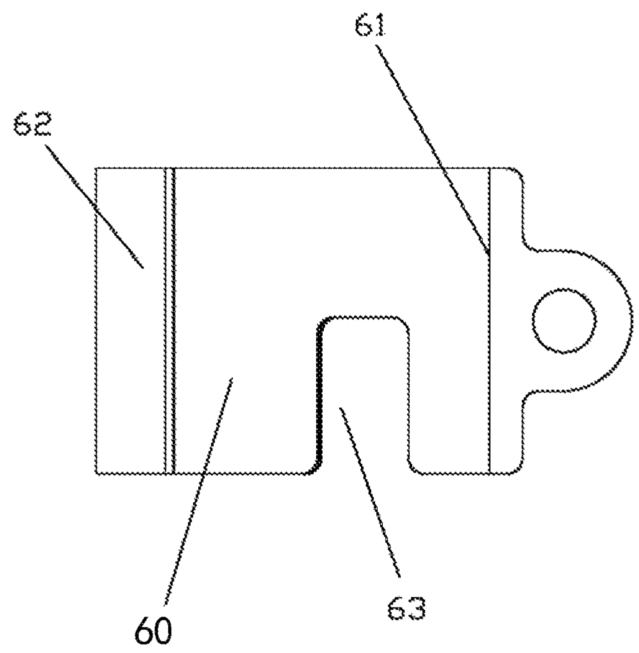
FIG. 45 is a top view of the flexible movable spring in the high-voltage DC relay according to the embodiment of the present disclosure.
Figure 46:
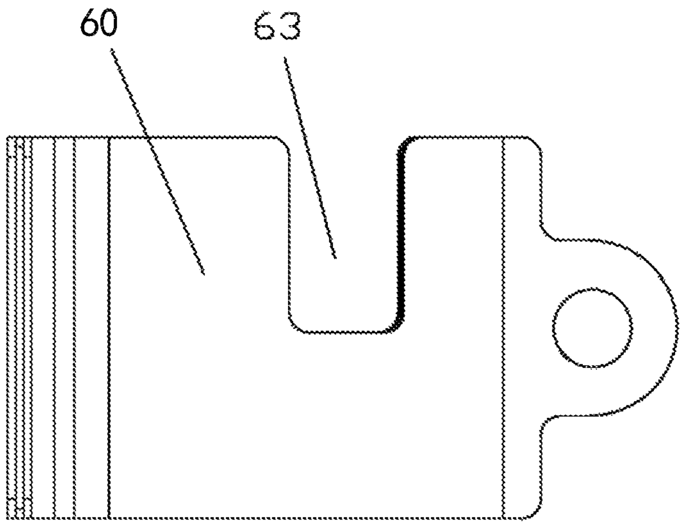
FIG. 46 is a bottom view of the flexible movable spring in the high-voltage DC relay according to the embodiment of the present disclosure.
Figure 47:
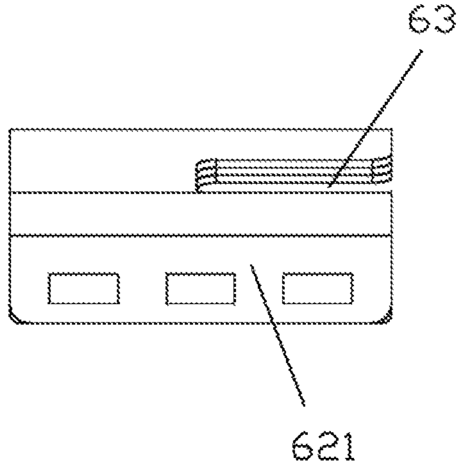
FIG. 47 is a left view of the flexible movable spring in the high-voltage DC relay according to the embodiment of the present disclosure.
Figure 48:
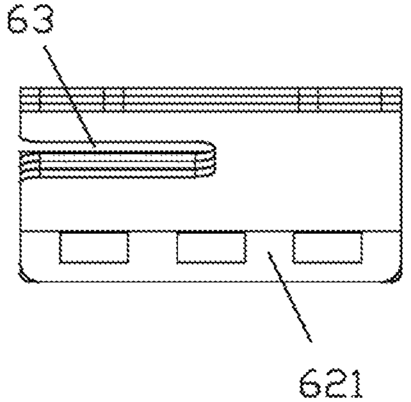
FIG. 48 is a right view of the flexible movable spring in the high-voltage DC relay according to the embodiment of the present disclosure.

As shown in FIGS. 37 and 38, the two flexible movable springs 60 and the straight sheet rigid movable springs 50 form two V-shaped structures. Since directions of the current passing through the two V-shaped structures are opposite, the directions of the two electromagnetic forces are opposite, that is, the electromagnetic force F1 acting on the flexible movable spring 60 is upward, and the electromagnetic force F4 acting on the straight sheet rigid movable spring 50 is downward, when passing through the overload current, for the main movable contacts 69, the flexible movable spring 60 is subjected to the upward electromagnetic force F1 and the downward electro-dynamic repulsion force F2, so that the electromagnetic force F1 can resist the electro-dynamic repulsion force F2 so as to improve the resistance to short-circuit capability. The electromagnetic force F4 subjected by the straight sheet rigid movable spring 50 is downward to be offset by the upward holding force F9 of a movable core. The flexible movable spring 60 is compressed in the closed state to generate an upward rebound force F6 so as to increase the pressure of the contacts. When the current is interrupted, the main movable contact 69 is subjected to a downward breaking force F5, since the two flexible springs 6 intersected are elastically deformed due to the repulsive force, the flexible movable springs are subjected to a restoring force F3, and the restoring force F3 is decomposed into transverse shearing force F7 and the breaking force F8, under the action of which together, the fused metal particles can be separated.

In one embodiment, the main movable contact 69 is a separate part, and is riveted and fixed on the upper end of the flexible movable spring 60. A first bending part 61 allowing the upper end of the flexible movable spring 60 to be substantially horizontal is provided on the upper part of the flexible movable spring 60.

In one embodiment, a second bending part 62 in U-shaped is provided on the lower end of the flexible movable spring 60, and the U-shaped opening of the second bending part 62 faces downward.

In one embodiment, an outside 621 of the U-shaped outer side of the second bending part 62 of the flexible movable spring 60 is fixed to the corresponding end of the straight sheet rigid movable spring 50 in a substantially vertical direction.

In one embodiment, receding notches 63 are provided in the middle of the two flexible movable springs 60, respectively. The receding notches 63 of the two flexible movable springs 60 are inserted into each other with gaps so as to allow the cross distribution of the flexible movable springs 60. The difference between the two flexible movable springs 60 in structure refers to difference in the directions towards which the receding notches 63 face.

An angle α between the upper parts of the two flexible movable springs 60 is greater than 90 degrees. In this embodiment, the angle α between the upper parts of the two flexible movable springs 6 is 146 degrees, and an included angle β between the flexible movable spring 60 and the straight sheet rigid movable spring 50 is 17 degrees. When the second bending part 62 is at the lower end (i.e., the base) of the flexible movable spring 60, the main movable contacts are at the same height, and the included angle β between the flexible movable spring 60 and the rigid movable spring 50 is smaller. In order to ensure sufficient pressure of the contacts and great compression amount, and when the current is interrupted, a counter-force of the rigid movable spring 50 becomes greater, and it is favorable to disconnect the contacts.

As shown in FIG. 38, when the movable and static contacts are closed, the main movable contact 69 moves upward to be in contact with the main static contacts 2, such that an included angle between the flexible movable spring 60 and the straight sheet rigid movable spring 50 becomes small, less than 17 degrees, and the flexible movable spring 60 can have an upward rebound force to provide the pressure for the contacts to reduce rebound of the contacts, so as to leave out a compression spring and not to increase the volume of the product.

In one embodiment, the flexible movable spring 60 is composed of three springs 64 laminated together.

According to the direct-acting high-voltage DC relay of the present disclosure, the movable spring part is designed to include a straight sheet rigid movable spring 50 and two flexible movable springs 60. The straight sheet rigid movable spring 50 is connected to the push rod assembly 30 so as to move along with the reciprocating movement of the push rod assembly 30, and has two ends respectively corresponding to below the two main static contacts 2, and the lower ends of the two flexible movable springs 60 are respectively fixed on the two ends of the straight sheet rigid movable spring 50. The two flexible movable springs 60 cross diagonally and extend upwards to below the corresponding ones of the respective main static contacts 2. The upper ends of the two flexible movable springs 60 are respectively provided with main movable contacts 69 to correspond to and match with the bottoms of the two main static contacts 2. According to the structure of the present disclosure, the two flexible movable springs 60 and the straight sheet rigid movable springs 50 form two V-shaped structures. The V-shaped structures form upward electromagnetic force F1 on the respective main movable contacts 69 to resist electro-dynamic repulsion force F2 downward formed on the main movable contacts due to the short-circuit current when the main static contacts are closed. On the other aspect, the two flexible movable springs 60 intersect to form a shearing force F7 in a horizontal direction, which can promote the main movable contact and the main static contact to move in cooperation along the horizontal direction when they are disconnected, so as to improve the anti-adhesion capability.

According to the direct-acting high-voltage DC relay of the present disclosure, a second bending part 62 in U-shaped is provided on the lower end of the flexible movable spring 60, and the U-shaped opening of the second bending part 62 faces downward. An outside 621 of the U-shaped outer side of the second bending part 62 of the flexible movable spring 60 is fixed to the corresponding end of the straight sheet rigid movable spring 50 in a substantially vertical manner. According to the structure of the present disclosure, after one side wall of the second bending part is fixed with the straight sheet rigid movable spring, the other side wall of the second bending part is equivalent to a retractable spring, which can enhance the elasticity of the overall movable spring, and the larger the elastic deformation is, and the stronger the anti-adhesion capability is.

According to the direct-acting high-voltage DC relay of the present disclosure, the second bending part 62 is arranged at the lower end (i.e., a base) of the flexible movable spring 60, a distance from the main movable contact 69 to the bending part is increased, and the flexibility of the movable spring is increased. When the electrodynamic repulsive force is generated by the contacts through the overload current, a compression amount of the movable spring increases, and a transverse shearing force becomes larger, so that it is favorable for the breaking of the contacts and has good anti-adhesion performance; and a force arm of the flexible movable spring 60 becomes longer, the force subjected by the flexible movable spring 60 becomes smaller, so as to avoid a risk of breakage occurred at the bending position.

It should be understood that this disclosure would never be limited to the detailed construction and arrangement of components as set forth in this specification. The present disclosure has other implementations that are able to be practiced or carried out in various ways. The foregoing variations and modifications fall within the scope of this disclosure. It should be understood that the present disclosure would contain all alternative combination of two or more individual features as mentioned or distinguished from in the text and/or in the drawings. All of these different combinations constitute a number of alternative aspects of the present disclosure. The implementations as illustrated in this specification are the best modes known to achieve the present disclosure and will enable the person skilled in the art to realize the present disclosure.

What is claimed is:

1. A high-voltage DC relay convenient for quick assembly, comprising a housing, a load leading-out terminal, a coil leading-out terminal, and an auxiliary leading-out terminal; each of the load leading-out terminal, the coil leading-out terminal and the auxiliary leading-out terminal being provided with a connecting part for electrical connection with an external component; wherein the connecting part of the load leading-out terminal, the connecting part of the coil leading-out terminal, and the connecting part of the auxiliary leading-out terminal are respectively exposed to the housing; the connecting part of the load leading-out terminal is arranged at a top end of the housing; and the connecting part of the coil leading-out terminal and the connecting part of the auxiliary leading-out terminal are arranged at a bottom end of the housing; each of the connecting part of the load leading-out terminal, the connecting part of the coil leading-out terminal and the connecting part of the auxiliary leading-out terminal has a plane for electrical connection with a corresponding one of the external components through welding, and the plane of the connecting part of the load leading-out terminal, the plane of the connecting part of the coil leading-out terminal and the plane of the connecting part of the auxiliary leading-out terminal are parallel mutually.

2. The high-voltage DC relay convenient for quick assembly according to claim 1, wherein the high-voltage DC relay further comprises a ceramic cover and a coil bobbin; the ceramic cover and the coil bobbin are respectively accommodated in the housing and arranged up and down; the load leading-out terminal arranged at a top of the ceramic cover; the coil leading-out terminal is arranged at a bottom of the coil bobbin; a head of the auxiliary leading-out terminal is arranged at the top of the ceramic cover, a tail of the auxiliary leading-out terminal extended to the bottom end of the housing by bypassing lateral sides of the ceramic cover and the coil bobbin; and the connecting part of the auxiliary leading-out terminal is at the tail of the auxiliary leading-out terminal.

3. The high-voltage DC relay convenient for quick assembly according to claim 2, wherein that each of the auxiliary leading-out terminal comprises an auxiliary static contact and a first connecting sheet; the auxiliary static contact is fixed at the top of the ceramic cover; one end of the first connecting sheet is connected with the auxiliary static contact at a top end of the ceramic cover, and a middle section of the first connecting sheet is bent so that the other end of the first connecting sheet serves as the tail of the auxiliary leading-out terminal and thereby is at the bottom end of the housing, so as to form the connecting part.

4. The high-voltage DC relay convenient for quick assembly according to claim 3, wherein the connecting part of the auxiliary leading-out terminal is bent to be U-shaped.

5. The high-voltage DC relay convenient for quick assembly according to claim 4, wherein the high-voltage DC relay further comprises a first injection piece in which a part of the first connecting sheet above the top end of the ceramic cover is covered, and a second injection piece in which a part of the first connecting sheet outside the lateral sides of the ceramic cover and the coil bobbin is covered.

6. The high-voltage DC relay convenient for quick assembly according to claim 5, wherein the second injection piece also covers top ends of two side walls of the connecting part in the U-shaped of the auxiliary leading-out terminal.

7. The high-voltage DC relay convenient for quick assembly according to claim 5, wherein a part of the first connecting sheet that is exposed outside the first injection piece and the second injection piece and is between the first injection piece and the second injection piece is a connecting section, and the connecting section is bent to be arc shaped.

8. The high-voltage DC relay convenient for quick assembly according to claim 2, wherein each of the coil leading-out terminal comprises a winding post and a second connecting sheet, and the winding post is integrally connected to one end of the second connecting sheet, and the other end of the second connecting sheet constitutes the connecting part of the coil leading-out terminal; the coil bobbin covers a part of the second connecting sheet.

9. The high-voltage DC relay convenient for quick assembly according to claim 8, wherein the connecting part of the coil leading-out terminal is bent to be U-shaped.

10. The high-voltage DC relay convenient for quick assembly according to claim 8, wherein a protrusion extends and is provided at the top of one of the two U-shaped side walls of the connecting part of the coil leading-out terminal, and the coil bobbin covers a tail end of the protrusion.

11. The high-voltage DC relay convenient for quick assembly according to claim 1, wherein the housing comprises an outer casing and a bottom plate; a receding notch and a receding through hole are defined in the bottom plate, the receding notch is located at an exposed position corresponding to the connecting part of the coil leading-out terminal, and the receding through hole is located at an exposed position corresponding to the connecting part of the auxiliary leading-out terminal.

12. The high-voltage DC relay convenient for quick assembly according to claim 11, wherein on a bottom surface of the bottom plate, receding slots are further provided on a periphery of the receding through hole and a periphery of the receding notch.

* * * * *